(12) United States Patent
Gabrys

(10) Patent No.: US 7,042,109 B2
(45) Date of Patent: May 9, 2006

(54) WIND TURBINE

(76) Inventor: Christopher W. Gabrys, 1001 S. Meadows Pkwy #1126, Reno, NV (US) 89521

( * ) Notice: Subject to any disclaimer, the term of this patent is extended or adjusted under 35 U.S.C. 154(b) by 178 days.

(21) Appl. No.: 10/651,383

(22) Filed: Aug. 30, 2003

(65) Prior Publication Data

US 2004/0041409 A1    Mar. 4, 2004

Related U.S. Application Data

(60) Provisional application No. 60/407,551, filed on Aug. 30, 2002.

(51) Int. Cl.
  *H02P 9/04* (2006.01)
  *F03D 9/00* (2006.01)
  *F03D 7/02* (2006.01)
  *F03B 15/06* (2006.01)

(52) U.S. Cl. ............................. 290/44; 290/55; 415/4.5

(58) Field of Classification Search ................. 290/44, 290/55; 416/7; 310/156.15, 156.12, 156.36, 310/156.54, 156.68, 179, 112; 415/4.5, 7, 415/907; 29/596, 598
  See application file for complete search history.

(56) References Cited

U.S. PATENT DOCUMENTS

| | | | | | |
|---|---|---|---|---|---|
| 3,979,619 | A | * | 9/1976 | Whiteley | 310/268 |
| 4,187,441 | A | * | 2/1980 | Oney | 310/112 |
| 4,218,630 | A | * | 8/1980 | Watanabe | 310/260 |
| 4,318,019 | A | * | 3/1982 | Teasley et al. | 310/156.35 |
| 4,508,998 | A | * | 4/1985 | Hahn | 318/138 |
| 4,763,050 | A | * | 8/1988 | Ruppert | 318/254 |
| 4,816,710 | A | * | 3/1989 | Silvaggio et al. | 310/194 |
| 4,968,911 | A | * | 11/1990 | Denk | 310/42 |
| 5,130,596 | A | * | 7/1992 | Umeki | 310/234 |
| 5,315,159 | A | | 5/1994 | Gribnau | 290/44 |
| 5,552,653 | A | * | 9/1996 | Nose | 310/263 |
| 5,625,241 | A | * | 4/1997 | Ewing et al. | 310/156.37 |
| 5,783,894 | A | | 7/1998 | Wither | 310/266 |
| 5,844,341 | A | | 12/1998 | Spooner et al. | 310/112 |
| 5,854,526 | A | * | 12/1998 | Sakamoto | 310/254 |
| 5,982,074 | A | * | 11/1999 | Smith et al. | 310/261 |
| 6,147,415 | A | * | 11/2000 | Fukada | 290/55 |

(Continued)

*Primary Examiner*—Darren Schuberg
*Assistant Examiner*—Julio Gonzalez
(74) *Attorney, Agent, or Firm*—J. Michael Neary

(57) ABSTRACT

A wind turbine for generating electrical power from wind energy includes a turbine rotor mounted for rotation in wind, and having multiple blades for converting energy in the wind into rotational energy. A generator is coupled with said turbine rotor such that said turbine rotor drives said generator. The generator has a stationary air core armature that is located in a magnetic airgap between two generator rotor portions. The generator rotor portions have circumferential arrays of multiple alternating polarity permanent magnets attached to ferromagnetic back irons such that the permanent magnets drive magnetic flux back and forth between each rotor portion and through the stationary air core armature. The stationary air core armature has multiple phase windings of multiple individually insulated strand conductor wire that is wound with two separate portions including an active length portion and an end turn portion. The end turn portion is located outside the magnetic airgap and traverses predominately circumferentially, and the active length portion is located in the magnetic airgap and traverses predominately non-circumferentially and perpendicular to the direction of the magnetic airgap. The end turn portion has a thickness that is greater than the thickness of said active length portion in the direction of said magnetic airgap. AC voltage is induced in the multiple phase windings as the turbine rotor rotates.

40 Claims, 31 Drawing Sheets

U.S. PATENT DOCUMENTS

| | | | |
|---|---|---|---|
| 6,215,199 B1 | 4/2001 | Lysenko et al. | 290/44 |
| 6,252,324 B1 * | 6/2001 | Muhr | 310/159 |
| 6,285,090 B1 | 9/2001 | Brutsaert | 290/55 |
| 6,373,161 B1 | 4/2002 | Khalaf | 310/154 |
| 6,445,105 B1 * | 9/2002 | Kliman et al. | 310/268 |
| 6,504,260 B1 | 1/2003 | Debleser | 290/44 |
| 6,515,390 B1 * | 2/2003 | Lopatinsky et al. | 310/178 |
| 6,828,710 B1 * | 12/2004 | Gabrys | 310/179 |

* cited by examiner

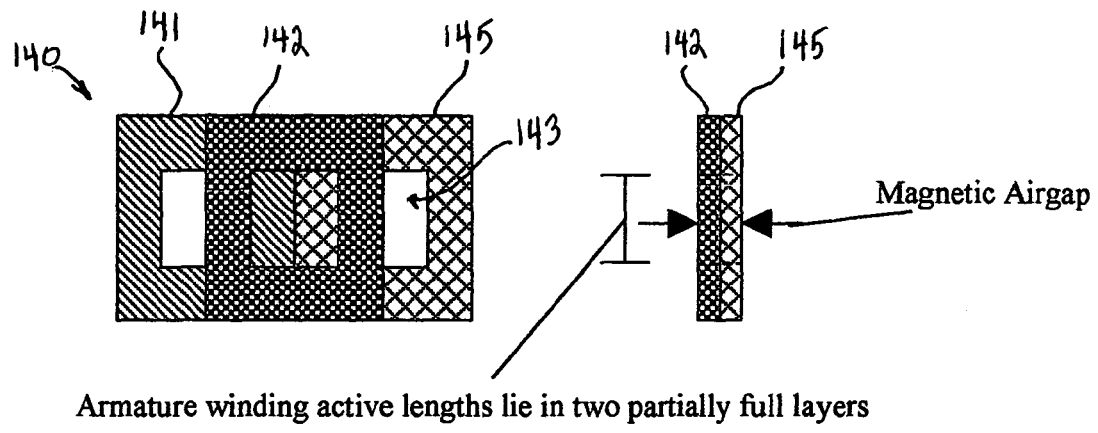
Armature winding active lengths lie in two partially full layers
Fig. 8A  Fig. 8B
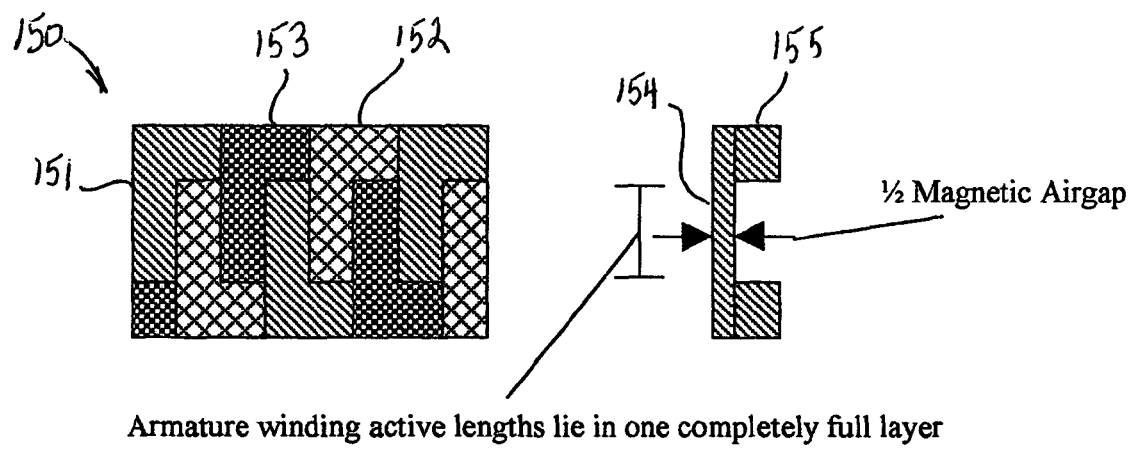
Armature winding active lengths lie in one completely full layer
Fig. 9A  Fig. 9B

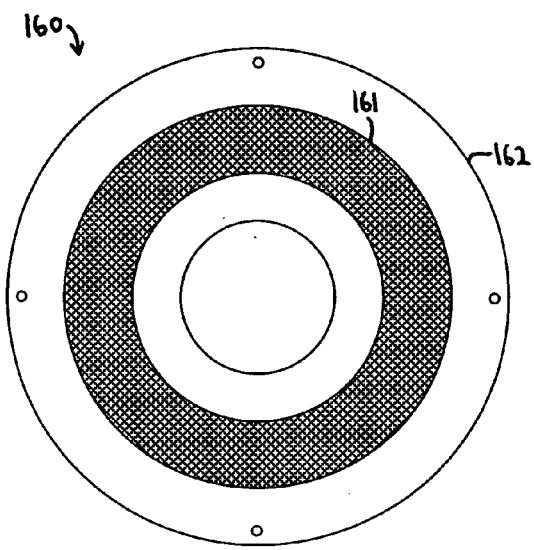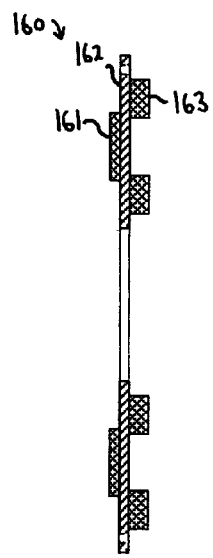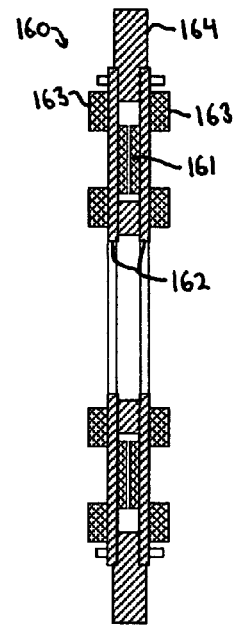
Fig. 11A  Fig. 11B  Fig. 11C
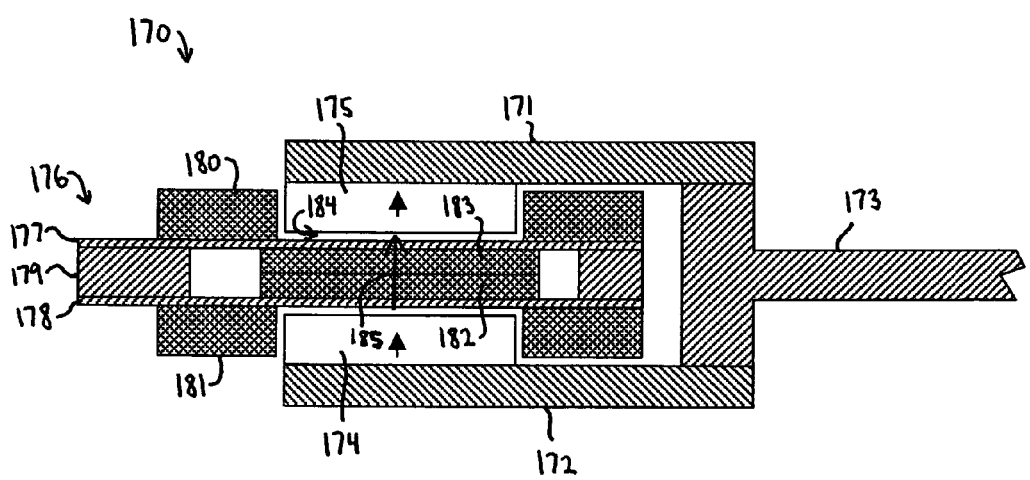
Fig. 12

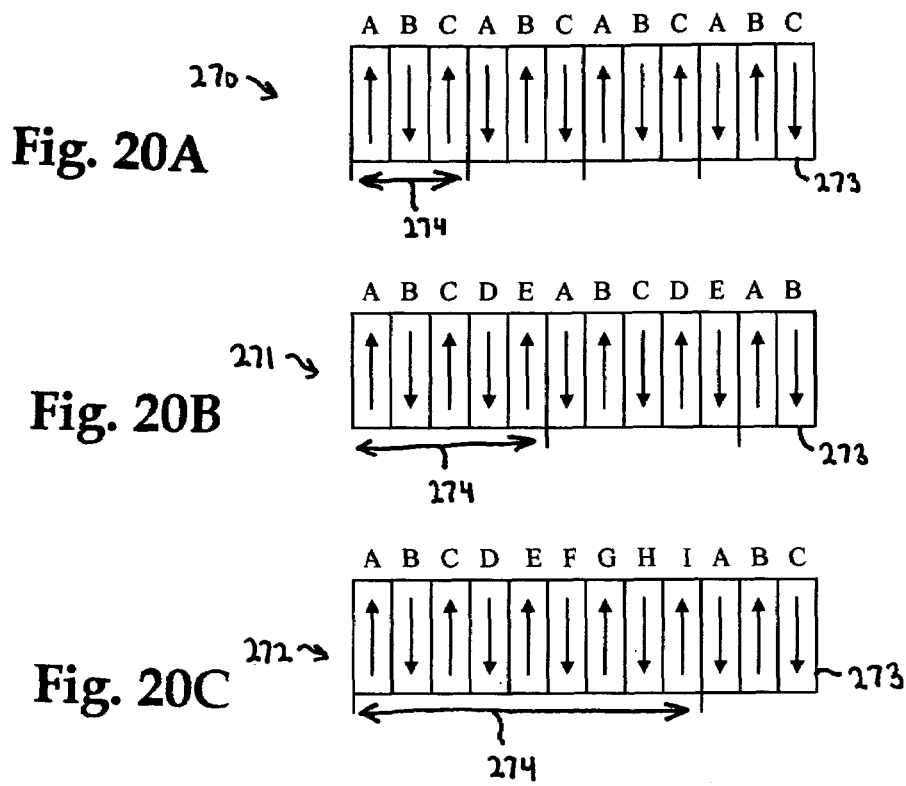
Fig. 20A
Fig. 20B
Fig. 20C
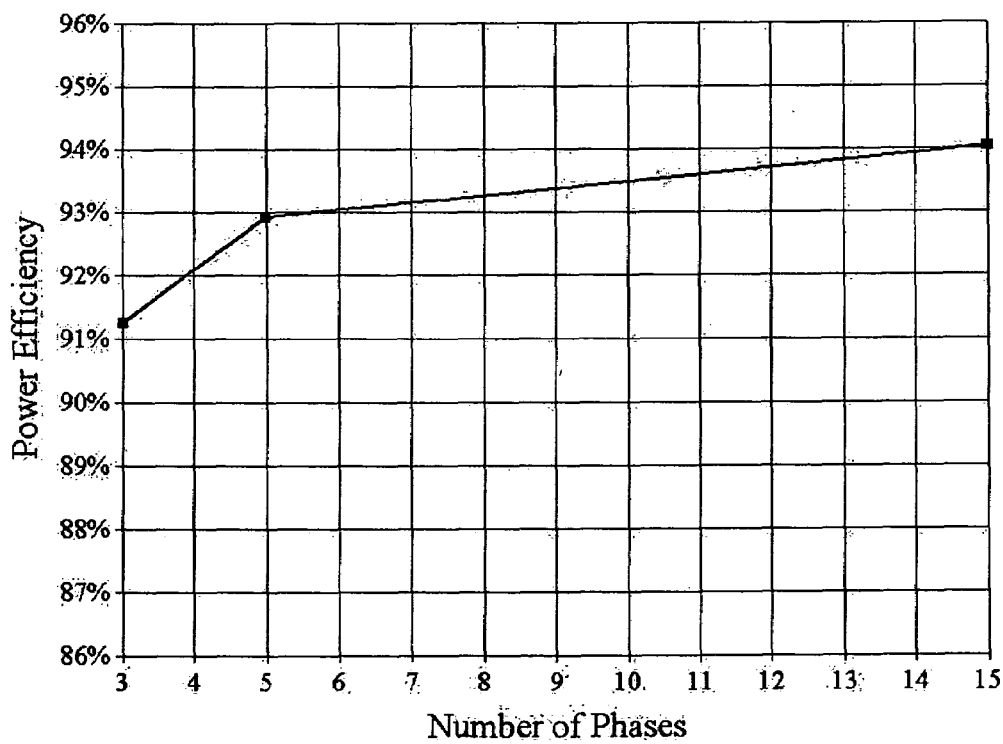
Fig. 20D

WIND TURBINE

This is related to U.S. Provisional Application No. 60/407,551 filed on Aug. 30, 2002 and entitled "Wind Turbine".

This invention pertains to wind turbines, and more particularly to a permanent magnet excited wind turbine having a specialized generator construction that provides increased efficiency and substantially lower costs per power generation. The wind turbine is compatible for use in low speed direct drive wind turbines and can provide reduced weight, quiet operation, near indefinite maintenance-free operation and the potential for modular construction allowing easier transportation.

BACKGROUND OF THE INVENTION

Use of wind turbines for generating electrical power is currently increasing while recent technical advances along with economics and legislation have made the use of wind turbines a viable generation alternative. Wind turbines range from small sizes of 1–50 kW for power generation for homes, farms and small business up to 5 MW in large scale off shore wind generating plants.

Wind turbines can utilize numerous constructions but are generally defined as either fixed speed or variable speed. Fixed speed wind turbines rotate at a fixed speed and employ an asynchronous or induction generator to produce power. The rotational rate of the turbine rotor is increased through the use of a speed increaser gearbox so that the induction generator produces either 50 or 60 Hz power. Fixed speed wind turbines allow for easy power connection because the generator can be directly connected to utility power grid.

Unfortunately, fixed speed wind turbines have numerous deficiencies. Operation at fixed speed puts increased stress and wear and tear on the turbine. The speed increaser gearbox reduces efficiency. The speed increaser gearbox is also the largest failure component of wind turbine operation and requires regular maintenance. Fixed speed operation is also very noisy especially in low wind when it is most noticeable. Although easily connected with utility power, the asynchronous generator provides low quality power with a low power factor. Induction generators also suffer from low efficiency and they do not generate power unless connected to grid power, eliminating the possibility of stand-alone generation.

Increasingly, use of variable speed wind turbines is becoming more preferred. Variable speed wind turbines rotate at speeds that vary with the wind speed. They can be designed to efficiently produce power even in reduced wind. As a result, variable speed wind turbines can capture more wind energy. In its most basic form, the turbine rotor drives a speed increaser gearbox that rotates a synchronous generator to produce power. The gearbox increases the rotational speed so that the generator can produce sufficient power. The output of the synchronous generator varies in voltage level and in frequency with the velocity of the wind. The power is rectified with a rectifier and then inverted with an inverter to provide high quality AC power.

To eliminate the reliability, maintenance and efficiency issues of the speed increaser gearbox in variable speed wind turbines, more recently, large diameter synchronous ring generators have been developed. Synchronous ring generators utilize a large diameter construction, in many cases over 3 meters, and have a very large number of magnetic poles. This construction allows them to generate high power even at low rotational speeds. The turbine rotor can then be directly coupled to drive the synchronous ring generator, without the use of a gearbox.

In general, wind turbines still need to overcome significant issues in order to reach their full potential for electrical power generation. The biggest challenge is the reduction of the cost per unit power generation capability. New wind turbines also need to reduce life cycle costs, particularly by increasing reliability and reducing required maintenance. Both are very significant concerns for enabling large wind farms and remote or off shore installations. Increased generation efficiency would further allow for production of more energy from wind turbines and would reduce the energy generation costs. Other areas for improvement also include noise reduction, especially for wind turbines located near residential areas.

Despite the development of variable speed wind turbines employing large synchronous ring generators, wind turbines continue to suffer from deficiencies. Most importantly, wind turbines with synchronous ring generators are very costly. This is due to both the use of a large amount of costly permanent magnets and/or electrical laminations and also to the very labor-intensive fabrication and assembly processes. Processes such as punching stacking, grinding, winding, insulating, coil inserting, coil connection and high tolerance alignment increase costs. On top of this, costly close tolerance components are required to achieve the required small magnetic airgaps for achieving efficient operation.

Other problems with current synchronous ring wind turbine generators include the need for extremely large and rigid generator structure and also assembly tooling to deal with the tremendous magnetic attraction forces between the rotor and stator portions. As a result of the massive structure, generators therefore become excessively heavy, making them more difficult to transport and to install. Wound field synchronous ring generators can eliminate the problem of rotor to stator attraction during assembly, but not in operation when field current is applied to the field coils for power generation. In addition, wound field generators are both more costly and achieve lower performance. Currently available synchronous ring generators suffer from less than optimal efficiency and provide limited power generation capability in reduced wind speeds. In many cases, substantial cooling systems are also required to cool the generator and remove energy that is wasted as heat. A new wind turbine with improved generator construction is needed.

SUMMARY OF THE INVENTION

Accordingly, the invention provides a wind turbine with increased efficiency and substantially lower costs per unit power generation. The wind turbine allows slow speed power generation with reduced weight, quiet operation, near indefinite maintenance-free operation and the potential for modular construction.

The wind turbine is comprised of a turbine rotor having two or more blades for converting wind energy into rotational energy. A permanent magnet generator is coupled with the turbine rotor such that the turbine rotor drives the generator. The generator comprises a stationary air core armature that is located in a magnetic airgap between two generator rotor portions. The generator rotor portions comprise circumferential arrays of multiple alternating polarity magnetic poles that drive flux back and forth between each rotor portion and through the stationary air core armature. The stationary air core armature comprises multiple phase windings such that AC voltage is induced in the multiple phase windings as the turbine rotor rotates.

Air core electrical machine construction is most commonly used in small high-speed electric motors, such as those in cameras and disk drives. In those applications, the reduced inductance from an air core armature allows for improved high-speed operation and the lack of lamination slots eliminates undesirable cogging vibrations. In contrast, the use of an air core armature generator construction for wind turbine power generation provides numerous other slow speed operation benefits.

The double rotating rotor topology in wind turbine generators according to this invention eliminates rotor to stator magnetic attraction, which is very large in wind turbine synchronous ring generators, due to the very large size. The generator structure can therefore be constructed substantially less rigid and also much lighter in weight. This facilitates fabrication, transportation and installation, and allows a reduction in costs.

Because the magnetic flux passes back and forth between the two rotor portions, and does not pass through a stationary steel stator, magnetic eddy current and hysteresis losses in a steel stator are virtually eliminated. The wind turbine generator can achieve significantly higher efficiency energy generation, creating more useable power. Efficiencies greater than 95% are readily achievable, which is up to 15% higher than other wind turbine generators.

The overall higher efficiency capability of the design allows for reduced or even eliminated active cooling systems, and can operate with reduced heating for longer life. The wind turbine can eliminate the need for a gearbox through use of a large diameter high pole number ring construction. It is especially capable of high power generation even at reduced rotational speeds. Without rotor to stator magnetic attraction or a slot wound armature, the generator is 100% cog free for silent generator operation.

The invention provides for substantially reduced manufacturing and operating costs. Fabrication and assembly of stator laminations are eliminated. The armature can be manufactured at much lower cost, and machining tolerances are made significantly easier. In operation, the wind turbine can produce more power, more efficiently and with a longer maintenance-free operating life.

In a preferred configuration, the generator is directly driven by the turbine rotor and without the use of a speed increaser gearbox. The elimination of a gearbox increases the generation efficiency and reliability, and eliminates the gearbox maintenance. The generator is constructed with diameter sufficient for direct low speed power generation matching the rated turbine rotational speed and power for the given wind turbine design. The turbine rotor can be directly attached to the generator shaft. Alternatively, the rotor blades can be attached to the generator rotor and the central shaft can be stationary. For smaller wind turbines, the wind turbine nacelle can potentially be eliminated. The turbine rotor is directly coupled to the generator rotor and the generator is directly mounted to the top of the tower. In some cases, it may be desirable to utilize a speed increaser gearbox. Use of a gearbox can reduce the required generator size and cost due to the higher rotational speed. A balance between the benefits of gearless and geared operation, such as reliability, maintenance, generator costs, gearbox costs and transportability, can be made by using only a single stage speed increaser.

The magnetic airgap can be either axial or radial. Use of an axial gap generator design allows for use of low cost flat axial magnetized magnets and a simple flat rotor structure. One drawback of an axial gap generator design is that the armature windings are necessarily radially diverging, and therefore have less than the maximum winding density at the outer diameter. For generators with a radially small magnetic pole compared to the pole diameter, this is not a significant issue. Radial gap construction can overcome this problem and can achieve higher winding because the windings extend axially in the magnetic airgap and do not diverge. However, radial gap construction can be more complex and costly.

The windings of the air core armature can be constructed by several means. One method is to individually wind coils and then assemble them by stacking and bonding them together to form the armature. This method unfortunately provides a reduced winding density and hence a lower than the maximum possible power generation and efficiency for a given generator. In a preferred embodiment, the armature windings are wound with a high density. The windings are wound with an active length portion and an end turn portion. The end turn portion is located outside the magnetic airgap and traverses predominately circumferentially and the active length portion is located in the magnetic airgap and traverses predominately non-circumferentially and perpendicular to the direction of the magnetic airgap. The end turn portion has a thickness that is greater than the thickness of the active length portion in the direction of the magnetic airgap.

A preferred fabrication method for air core armature construction includes winding and bonding the windings onto a substantially nonmagnetic and electrically non-conducting form such as a fiberglass laminate sheet. The windings can be wound as coils or alternatively as serpentine paths, which can facilitate faster manufacturing. In order to achieve high density, the windings can be wound such that the active lengths are on one side of the form and the end turns are on the other. In this way, overlapping of the end turns does not cause an increase in the thickness of the active length portion. The form can utilize slots or inner and outer diameter end features such that the windings pass through the slots when traversing between active lengths and end turns. The form allows for easy mounting in the wind turbine generator. The bonding of the windings to the form increases the structural integrity and rigidity of the armature.

Although the windings can be wound with a trapezoidal back emf such that the active lengths of multiple phases are covered by a single magnetic pole at a time, the armature can also be wound with sinusoidal back emf. In this case, the active lengths of only a single phase are preferably covered by a single pole at a given time. A single phase can completely occupy a single layer of windings. Multiple phases can be added by stacking each phase in layers throughout the magnetic airgap thickness with each phase shift in angular position accordingly.

Because the windings of the air core armature are located directly in the magnetic airgap, a varying magnetic flux is passed through the windings. The changing flux causes eddy currents to be generated in the windings and hence could substantially reduce the generator efficiency. To preclude the development of large eddy current losses in the actual armature windings, the windings are preferably wound with wire having a small diameter size. In a preferred embodiment, the armature windings are wound using Litz wire, or multiple individually insulated strand conductor wire. The smaller the strand diameter, the smaller are the losses. However, the use of a higher number of strands allows the total cross-sectional area to remain high and electrical resistance low.

Winding the armature windings is much easier with multiple individually insulated strand conductor wire having a small diameter, and it allows better compactability for a higher density armature. Stranded wire can be compacted such that it expands circumferentially to fill the spaces between conductors and thereby has the minimum thickness. For the same thickness armature, more windings cross-sectional area can be achieved, for substantially increased power generation and efficiency.

Because of the large generator diameter required for directly driven or slow speed wind turbines, manufacturing of the armature can be difficult. For large wind generators, conventional dip tanks for resin impregnation are not practical. A preferred manufacturing method is to wind the armature and then bond and cure the windings together using tooling. The wound armature is then placed on the tooling and enclosed by a vacuum bag or flexible film layer and an internal vacuum is pulled. Use of a vacuum bag allows for exertion of substantial compaction pressure over the entire armature. Resin in the windings is then cured while under pressure against the tooling so that the result is a strong compacted structural armature with precise tolerances. Resin can be introduced to the windings before evacuating, bondable-coated wire can be used or alternatively vacuum assisted resin transfer molding can be utilized. One or more hoses communicating through the vacuum bag to the armature also connect to a container of resin that flows into the vacuum bag to impregnate the windings when unrestrained.

Conventional electrical generators typically utilize either single or three-phase construction. Three-phase construction is used most commonly for wind turbine generators to reduce ripple when the power is rectified. It has been found, however, that three phase windings only provide 66% instantaneous phase utilization for providing power. Typically, only two of the three windings have electric current at a particular instant and hence the output current per phase and generator losses are increased compared with the desired full utilization. To increase the efficiency of the generator, using a higher number of phases in the air core armature can increase the windings utilization. Use of armatures with more than three phases can increase the percentage of instantaneous utilization and reduce the resistive generator losses.

The magnetic poles of the generator rotor portions can be constructed by several methods. In a preferred construction the rotor portions comprise alternating polarity permanent magnets and more preferably the magnets are attached to ferromagnetic back irons. Use of ferromagnetic back irons, typically steel or iron, provides a reduced reluctance path connecting the flux between adjacent permanent magnets. The result is a substantial increase in the airgap magnetic flux density. Although heavier in construction than use of other materials, such as aluminum, for the generator rotor portions, the ferromagnetic back irons also provide for much easier assembly. The magnets can be magnetically stuck to the back irons in the proper locations, with or without bonding.

The back irons are preferably constructed from ferromagnetic material that has a high magnetic permeability and saturation while also having a low cost due to the very large structure, in many cases. The high permeability further increases the airgap flux density for increased power and efficiency. A high saturation allows for the back iron thickness to be reduced, reducing weight. The most preferable ferromagnetic materials have a low carbon percentage, preferably under 2%, and are also utilized in a low hardened condition, such as annealed.

The magnetic poles can comprise alternating polarity permanent magnets or alternately spaced, like-polarity, permanent magnets with steel consequence poles in between each magnet. This method allows for a reduced number of permanent magnets. Unfortunately, it is less desirable because for the same amount of magnet material, the generator thickness at the poles is doubled. The generator therefore becomes much heavier. Also, it has been found that the airgap flux density is reduced compared with the alternating polarity permanent magnet configuration.

Even with use of alternating polarity permanent magnets for the poles, it is possible to utilize magnets on only one side of the magnetic airgap. The other side consists of only the back iron, which by proximity with the magnet rotor, forms alternating consequence poles. Again this reduces the number of required magnets. However, the thickness of the magnets must be doubled for the same generator. It has also been found that even with the same amount of permanent magnet material, utilizing magnets on both rotor portions can provide a significant increase in the airgap flux density over the single rotor with magnets design.

In many cases, the preferred magnet material is NdFeB due to its high-energy product and high flux density per cost. However, other types of magnets could also be utilized. Magnets are typically the most costly generator material per weight. It is therefore desirable to minimize the required amount of magnet material. Increasing the magnet utilization for power generation in the generator design can do this. It has been found that in many cases the maximum amount of generator power generation can be achieved by designing the generator to have a maximum magnetic flux density in the magnetic airgap, Bg, in Tesla such that $0.3 \leq Bg \leq 0.7$. It has also been found that in many cases, the preferred magnet and airgap dimensions can be defined such that the airgap has a thickness in the direction of flux in inches, y, and the permanent magnets of both rotors combined have a total thickness in the direction of flux in inches, 2x, and that $0.2 \leq x/y \leq 1.0$. These design criteria are influenced by numerous generator design parameters, however they have been found not to be significantly influenced by the magnet material grade.

Adjacent alternating polarity magnets of the rotor portions tend to suffer from some amount of magnetic leakage. A portion of the magnetic flux from one magnet jumps to the circumferentially adjacent magnet instead of across the magnetic airgap where it can generate power in the air core armature. Instead, the leakage flux generates no power. The circumferential positions where flux bridges the airgap with a high flux density corresponds to a live zone and the portions on the ends of the magnets near the interface where leakage occurs corresponds to a dead zone. To increase magnet utilization and hence reduce the magnet costs for a given power generator, several methods can be utilized. The magnet material that generates leakage flux can be eliminated. In this case, circumferential spaces are left between the magnets, typically greater than 0.10 inches, and potentially several times that amount, depending on the generator size.

A second method for reducing the effects of adjacent pole magnetic leakage is to increase the circumferential pole width. Although the amount of leakage between adjacent magnets remains the same, the total leakage flux is reduced, the percentage live zone is increased, and the percentage of dead zone is reduced. Increasing the circumferential pole width for a given design can be achieved by limiting the ratio of the number of poles divided by the generator diameter. The drawback of using a reduced number of poles is that the thickness of the back irons must be increased to prevent saturation, thereby increasing the generator weight.

The dead zone width is also a function of the gap magnetic flux density and thickness of the armature airgap. Generators with reduced airgap flux densities produce larger dead zones. This needs to be factored into the over optimized generator design.

One of the significant advantages of the invention besides increased efficiency and reduced costs is the ability to employ modular construction. In the case of megawatt-size direct drive wind turbines, the synchronous ring generators are very large, typically 3–5 meters in diameter. Manufacturing, handling transporting and installing such large generators incurs significant difficulties and costs. It would be desirable to be able to transport the generator in smaller modular sections that can be assembled at the installation location. The two generator rotor portions of the invention accordingly can be made from multiple arc sections that assembled during installation. The air core armature can also easily be made from multiple arc sections that are assembled and wired together. The uncomplicated design, much easier tolerances and lack of rotor to stator magnetic attraction facilitate modularization of the generator and easier on-site assembly.

The power system for the wind turbine can utilize any of those used with variable speed wind turbines as is well known in the art. In one common method, the AC output of the generator is rectified by a rectifier and then inverted by an inverter to provide utility grade power. Alternatively, the variable frequency AC power from the generator can be directly converted to fixed frequency utility grade AC power through the use of a cycloconverter.

DESCRIPTION OF THE DRAWINGS

FIGS. 8A and 8B are schematic elevation and side section drawings of air core armature windings with low winding density.

FIGS. 9A and 9B are schematic elevation and side section drawings of air core armature windings with high winding density.

FIG. 11A is a schematic plan view of an air core armature construction in accordance with the invention.

FIG. 11B is a side view of the air core armature shown in FIG. 11A.

FIG. 11C is a side view of an alternate configuration air core armature construction in accordance with the invention.

FIG. 12 is a schematic drawing of a generator cross-section utilizing the air core armature of FIG. 11C.

FIG. 20A is a schematic drawing of an air core armature having three phases.

FIG. 20B is a schematic drawing of an air core armature having five phases.

FIG. 20C is a schematic drawing of an air core armature having fifteen phases.

FIG. 20D is a graph showing generator efficiency versus number of phases.

DESCRIPTION OF THE PREFERRED EMBODIMENT

Figure 1:
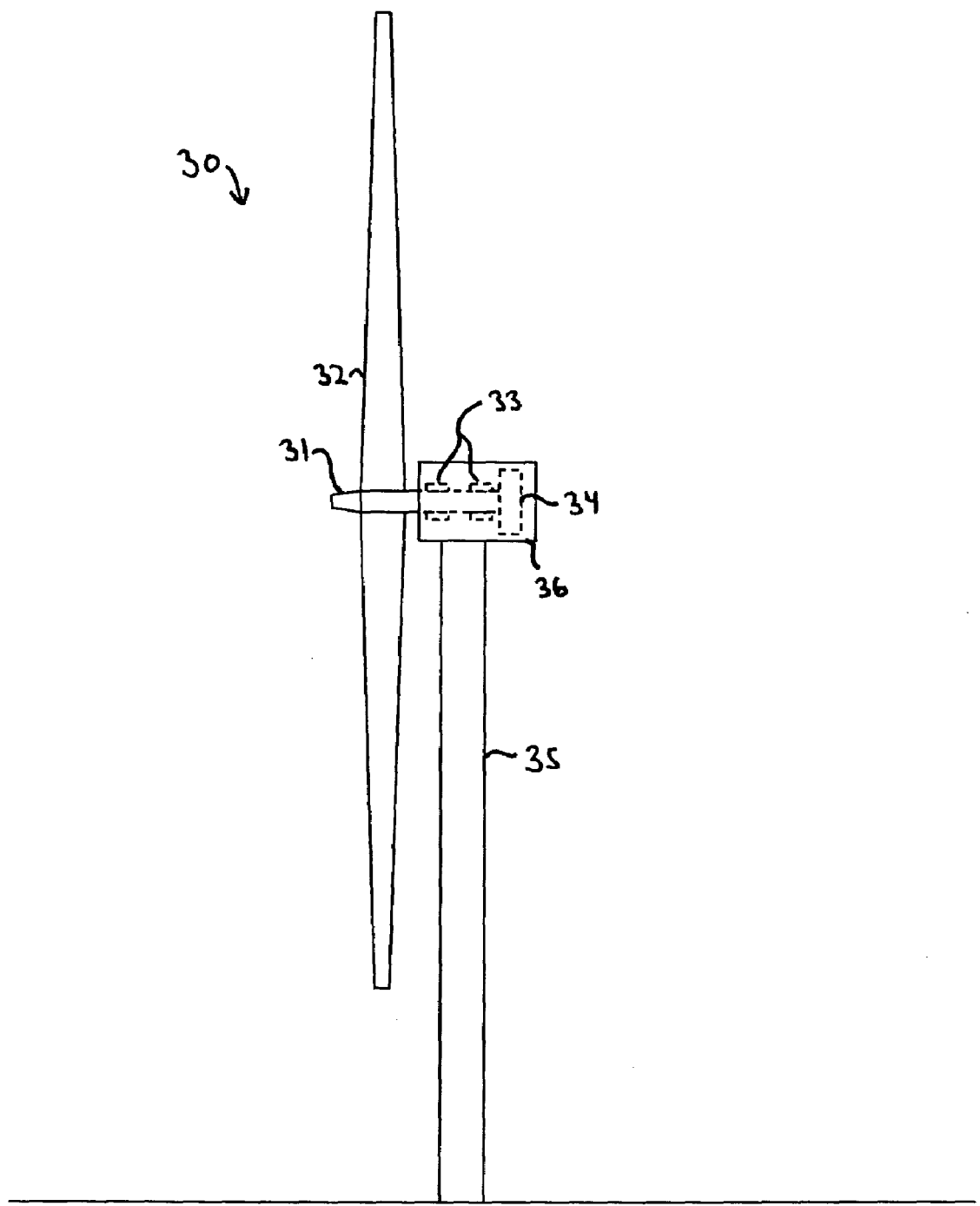
FIG. 1 is a schematic elevation of a wind turbine in accordance with the invention.

Turning to the drawings wherein like characters designate identical or corresponding parts, a wind turbine 30, shown in FIG. 1. includes a turbine rotor 31 having multiple blades 32 that are driven by the wind. The turbine rotor 31 is supported a bearing system 33 and drives an electrical generator 34. The generator 34 is housed in a nacelle 36 on top of a support pole 35. Other configurations for a driving the generator by wind energy could also be used in accordance with the invention. For instance, a gearbox could be utilized, but this typically reduces efficiency and reliability. In most cases, it is preferable to eliminate the gearbox for new wind turbines by using direct-drive generators in accordance with the invention, and achieving full power and voltage at the rotational speed of the turbine rotor.

Figure 2:
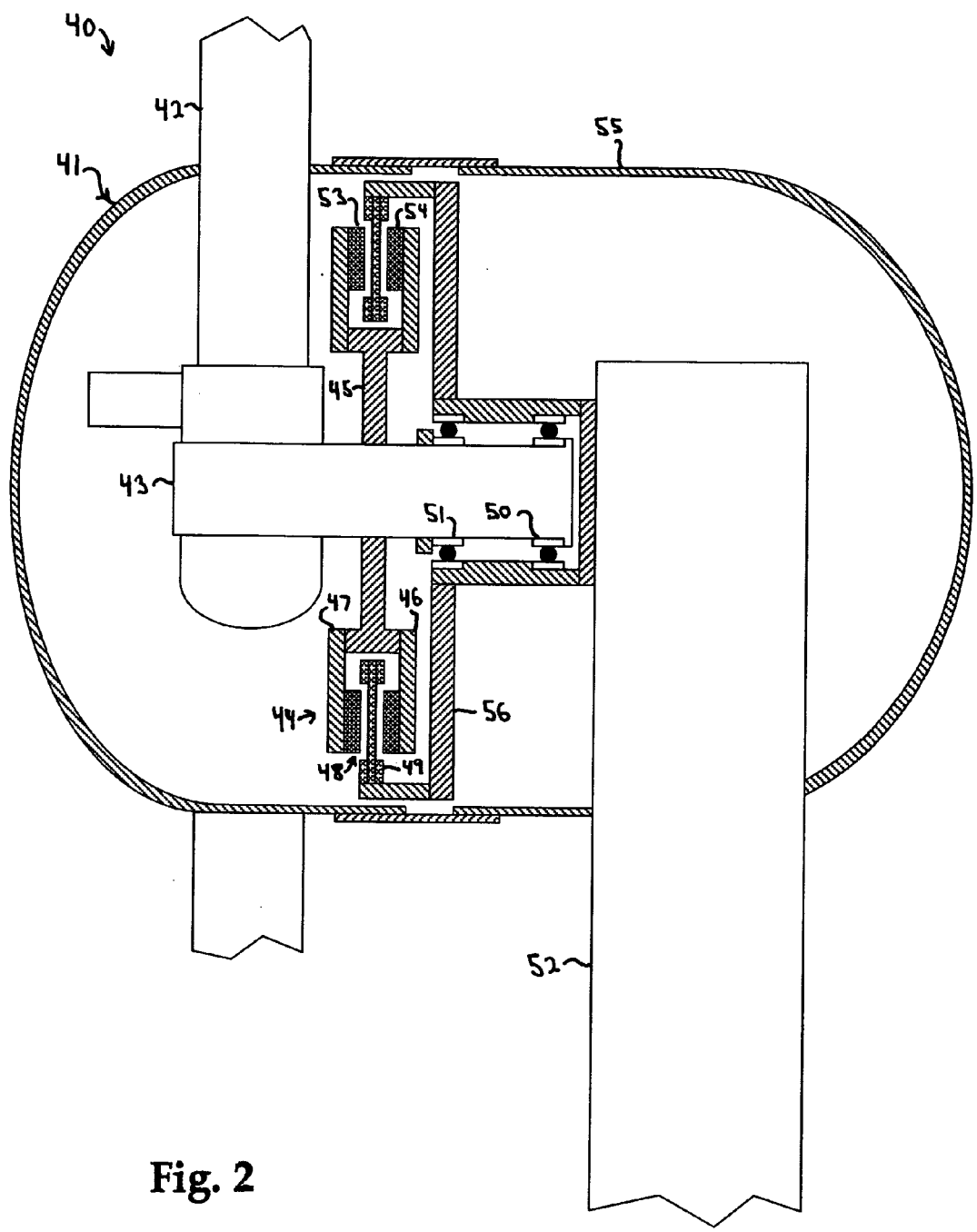
FIG. 2 is a schematic close up elevation of a wind turbine in accordance with the invention.
Figure 6:
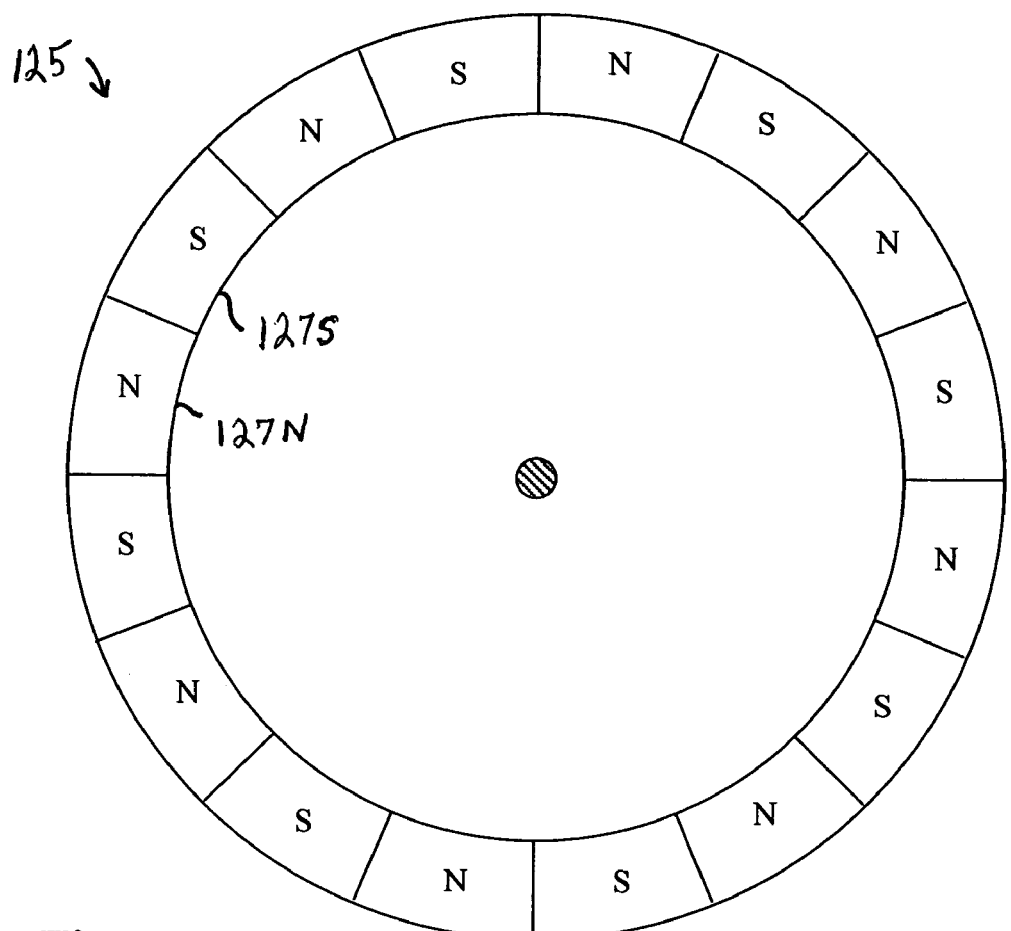
FIG. 6 is a schematic drawing of a generator rotor in accordance with the invention.
Figure 7:
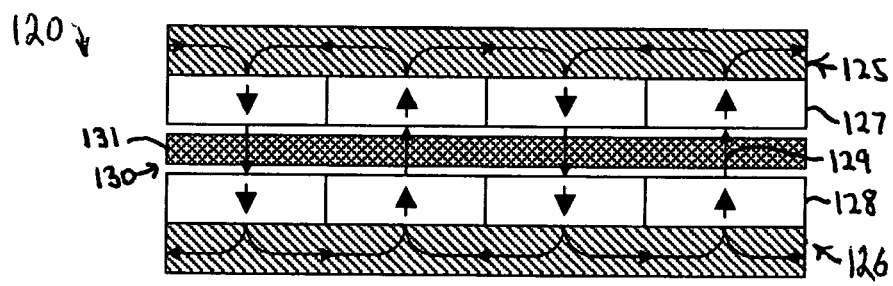
FIG. 7 is a schematic circumferential section of a generator in accordance with the invention.

A wind turbine 40 is shown in FIG. 2 having a turbine rotor 41 with two or more blades 42 for converting wind energy into rotational energy. The turbine rotor 41 is attached to a drive shaft 43 that is supported by bearings 50, 51. The turbine rotor 41 drives a generator 44 for producing electric power. The generator has a rotor 45 that is directly connected to the drive shaft 43. The generator rotor 45 has two annular, axially spaced generator rotor portions 46, 47, each of which have circumferential arrays of multiple alternating polarity magnetic poles 53, 54, for example as shown in FIGS. 6 and 7. The magnetic poles 53, 54 drive magnetic flux back and forth across a magnetic airgap 48 between the two generator rotor portions 46, 47. Located in the magnetic airgap 48 is an air core armature 49. The armature 49 has multiple phase windings that are wound on a substantially nonmagnetic structure in the magnetic airgap 48 so that the flux readily passes through the armature 49 when passing between the magnet poles 53, 54. As the turbine rotor 41 rotates, AC voltage is induced in the windings of the armature 49. The air core armature 49 is supported by a stationary structural support 56 that is mounted to the top of the tower 52. A nacelle 55 encloses the generator 44 to protect it from the elements.

Figure 3:
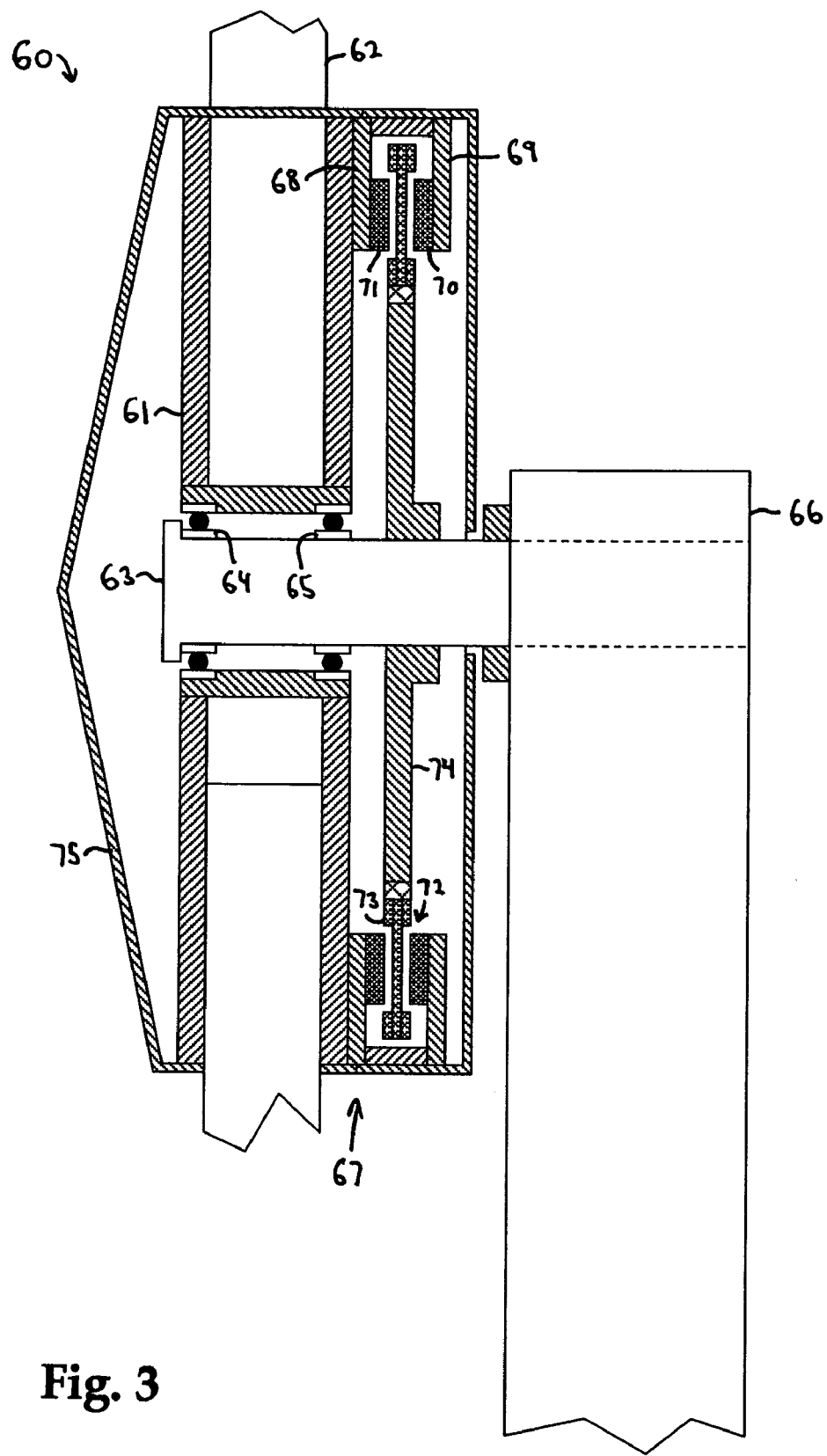
FIG. 3 is a schematic close up drawing of an alternate configuration wind turbine in accordance with the invention.

An alternate configuration wind turbine 60, shown in FIG. 3, includes a turbine rotor 61 having multiple blades 62. The blades 62 convert wind energy into rotational energy of the rotor 61. In this configuration, the turbine rotor 61 rotates about a stationary shaft 63 and is supported by bearings 64, 65. The shaft 63 is directly mounted to the top of the tower pole 66. The turbine rotor 61 directly drives a generator 67 for producing electric power from the rotational energy. The generator 67 is comprised of two annular, axially-spaced generator rotor portions 68, 69 that define therebetween an airgap 72. The generator rotor portions 68, 69 are directly attached to the turbine rotor 61 and have circumferential arrays of multiple alternating polarity magnetic poles 70, 71 facing each other across the airgap 72, for example, as shown in FIGS. 6 and 7. The magnetic poles 70, 71 drive magnetic flux back and forth between the two generator rotor portions 58, 69 and across the magnetic airgap 72. A stationary air core armature 73 is located in the magnetic airgap 72. The armature 73 is supported by a structural mount 74 that rigidly attaches to the center shaft 63 for transferring torque. The air core armature 73 has multiple phase windings such that AC voltage is induced in the windings as the turbine rotor 61 rotates. An outer nacelle 75 encloses the generator 67 to protect it for the weather.

Figure 4:
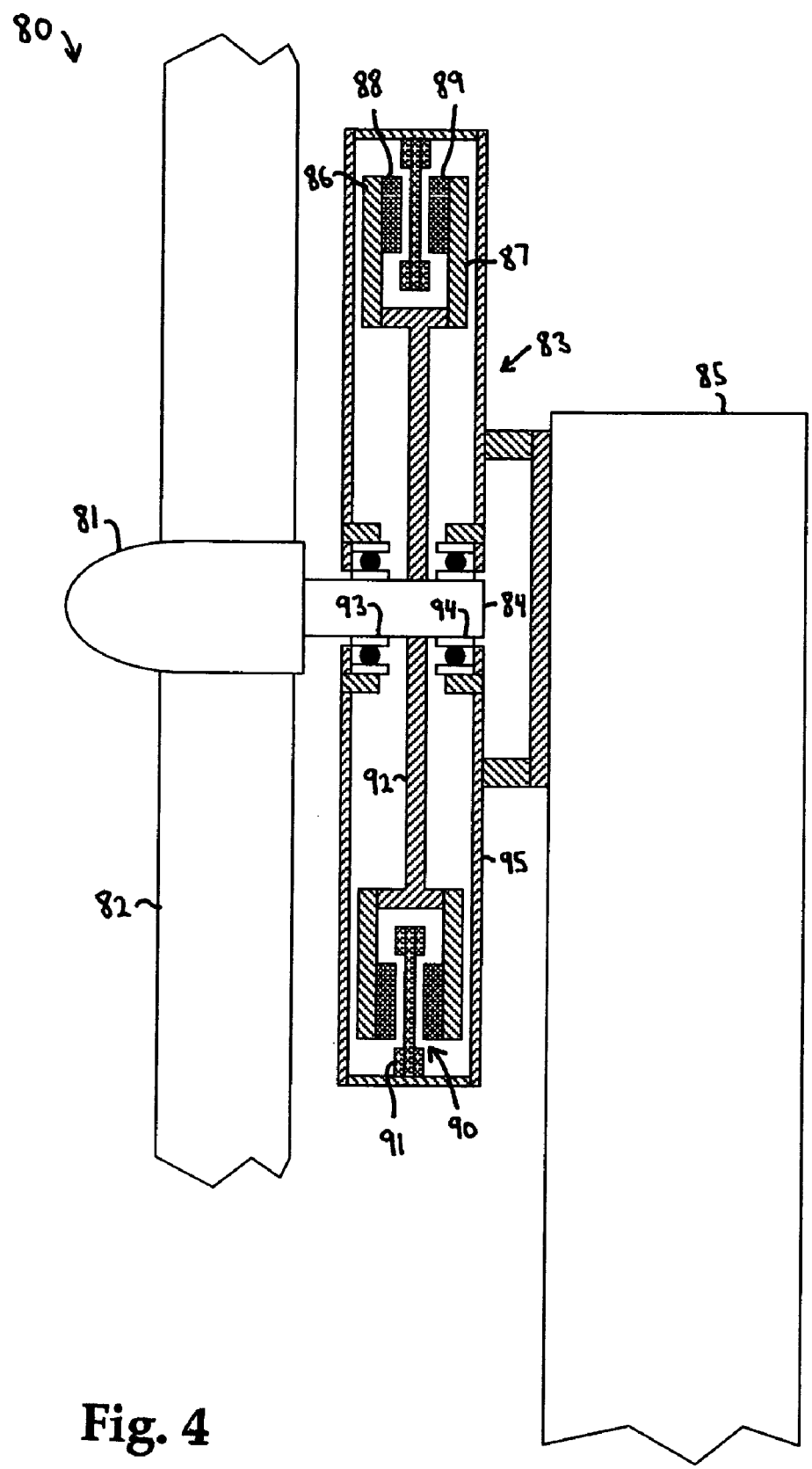
FIG. 4 is a schematic close up drawing of a second alternate configuration wind turbine in accordance with the invention.

A second alternate configuration wind turbine 80, shown in FIG. 4, includes a turbine rotor 81 that has a plurality of blades 82 for converting wind energy into rotational energy. In this configuration, which is particularly well suited for small wind turbines, the installation is made easier by three separate piece construction. The turbine rotor 81 is directly attached to the shaft 84 of a generator 83, and the generator 83 is directly attached to the top of the tower pole 85. The generator 83 includes two annular, axially-spaced rotor portions 86, 87 defining therebetween an airgap 90. Circumferential arrays of multiple alternating polarity magnetic poles 88, 89 drive magnetic flux back and forth between the two generator rotor portions 86, 87 and across the magnetic airgap 90. A stationary air core armature 91 is attached to a generator housing and extends radially into the airgap 90. The air core armature 91 is wound with multiple phase windings such that AC voltage is induced in the windings as the turbine rotor 81 rotates. The two generator rotor portions 86, 87 are connected to the central shaft 84 through a hub 92. The shaft 84 is journalled for rotation by bearings 93, 94, which are mounted in the generator housing 95.

Figure 5:
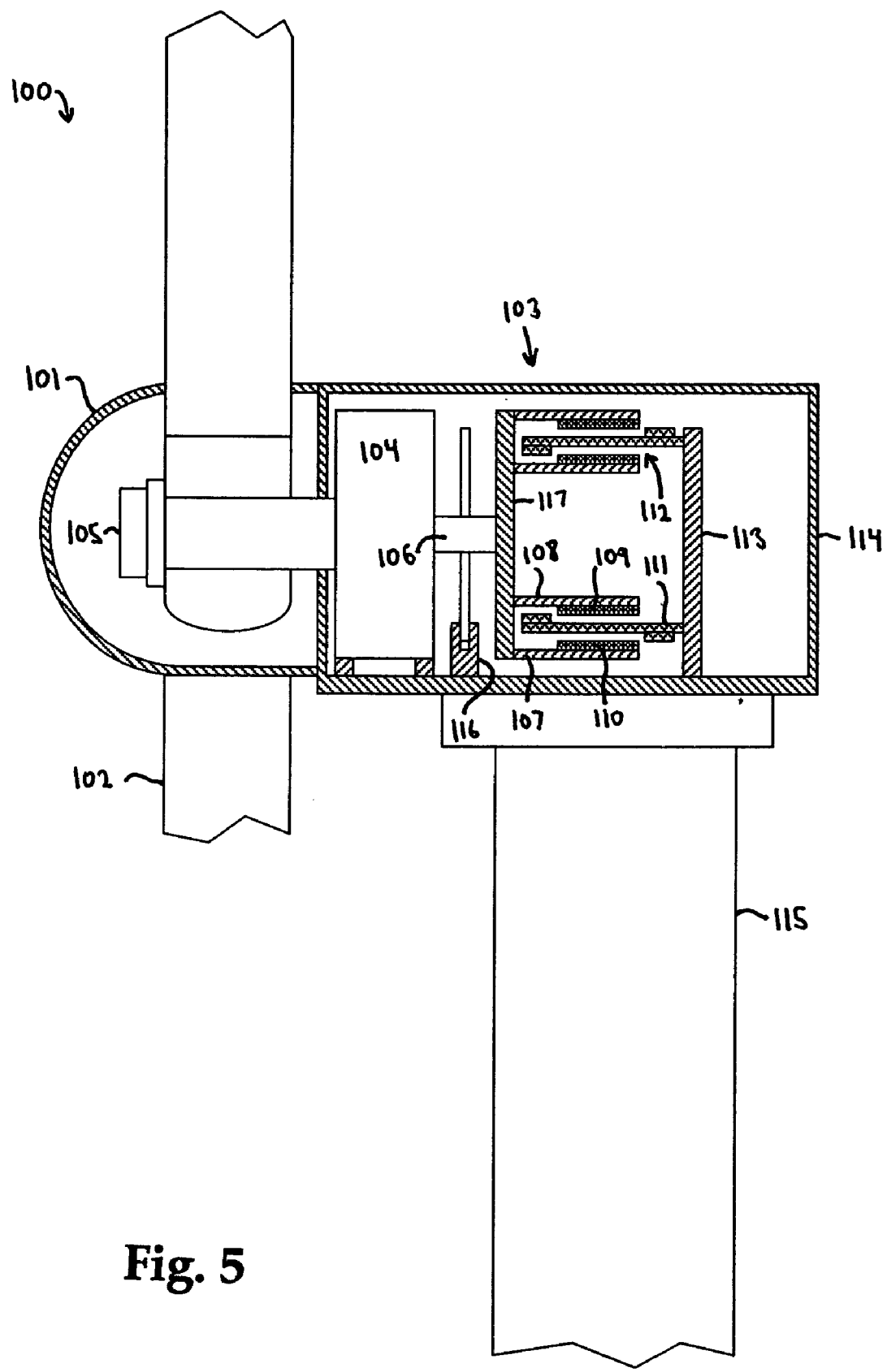
FIG. 5 is a schematic close up drawing of a third alternate configuration wind turbine in accordance with the invention.

A third alternate configuration wind turbine generator 100, shown in FIG. 5, utilizes a gearbox 104 to increase the speed of the generator. In most cases, it is desirable to eliminate the gearbox from wind turbines in order to increase the reliability and efficiency, but in some cases it may be desirable to utilize a gearbox to provide some rotational speed increase to the generator. The size and cost of the generator can be reduced for generating the same power level if it can be rotated faster. A tradeoff can be made between the gearbox maintenance and reliability issues and the generator size and cost.

The wind turbine 100 includes a turbine rotor 101 that has multiple blades 102 for converting wind energy into rotational energy. The turbine rotor 101 drives a generator 103 through the speed increaser gearbox 104, such as a single stage planetary drive. The turbine rotor 101 is connected to a turbine shaft 105 that connects to the gearbox 104. A generator shaft 106 connects the high-speed output of the gearbox 104 to the generator 103. In the design shown, the generator 103 utilizes a radial gap configuration instead of an axial gap configuration. Axial and radial gap generators each have different benefits. Axial gap generators in accordance with the invention allow for use of the lowest cost flat axially magnets and simple assembly. Radial gap generators in accordance with the invention, however, can provide for increased armature winding density because the windings do not need to diverge radially.

The generator 103 is comprised of two radially spaced generator rotor portions 107, 108 defining therebetween a radial airgap 112. The two generator rotor portions 107, 108 are connected to the generator shaft 106 through the use of a hub 117. A brake 116 is provided to the generator shaft 106 to slow the turbine rotor 101 when required. The generator 103 and gearbox 104 are enclosed in a nacelle 114, which is attached to the top of a support tower 115.

Circumferential arrays of multiple alternating polarity magnetic poles 109, 110 are attached to the rotor portions 107, 108 to drive magnetic flux back and forth between the generator rotor portions 107, 108 and across the magnetic airgap 112. A cylindrical air core armature 111 with multiple phase windings extends axially into the airgap 112 to receive fluctuating flux as the generator rotor rotates such that AC voltage is induced in the windings. The armature 111 is fixed to a support mount 113 attached to the nacelle 114 for transferring reaction torque from the armature to the tower 115.

An axial gap generator rotor 120, shown in FIGS. 6 and 7, has multiple alternating north and south magnetic poles 127S, 127N around the circumference that faces the magnetic airgap, for example, the magnetic airgap 90 in FIG. 4. The generator rotor 120, shown in circumferential section in FIG. 7, includes two generator rotor portions 125, 126 that are preferably constructed from ferromagnetic material such as steel or iron so as to be good conductors of magnetic flux. Multiple alternating polarity magnetic poles 127, 128 are attached to the rotor portions 125, 126. The magnetic poles 127, 128 preferably comprise permanent magnets such as high-energy product magnets including NdFeB. Other types of magnets could also be used, such as ceramic or samarium cobalt, with either reduced flux density or increased temperature capability. The magnets 127, 128 drive magnetic flux 129 across a large magnetic airgap 131.

An air core armature 131 is located in the magnetic airgap 129 between the two rotor portions 125, 126 for generation of power as the magnetic poles 127, 128 move past. The air core armature 131 minimizes magnetic hysteresis and eddy current losses that would other wise occur in conventional steel stators, such as slot wound or toroid configurations. Also, no magnetic attraction exists between the rotor portions 125, 126, 127, 128 and the stationary armature 131, which allows for less rigid and lighter weight construction. The lack of a ferromagnetic core also reduces the inductance of the armature providing for improved power factor and increased power generation. Although some small amount of ferromagnetic material could potentially be utilized in the armature for various support purposes, the armature would still be considered to be air core if the magnetic flux 129 traversing between the rotor portions 125, 126 was not significantly affected. Use of a completely nonmagnetic and nonconducting structure (besides the windings) is most preferable though, to minimize magnetic losses that would reduce the efficiency. The magnetic flux 129 loops circumferentially between adjacent magnets 127 through the rotor portion 125, and between adjacent magnets 128 through the rotor portion 126.

The air core armature can be constructed in several ways. An air core armature 140, shown in FIGS. 8A and 8B, is constructed from multiple phase coils 141, 142, 145 that are arranged around the armature circumference. The coils 141, 142, 145 can be pre-wound utilizing conventional winding machines. The coils 141, 142, 145 are then stacked together. Unfortunately, spaces 143 are left in the center of the coils 141, 142, 145. The result is that the armature active lengths lie in two partially full layers, for the example. The armature 140 therefore has a large thickness, low winding density and requires a large magnetic airgap 144.

For achieving the highest power capability and efficiency, it is preferable to obtain the highest possible winding density in the armature. The higher the winding density, the greater the amount of windings provided for a given magnetic airgap and flux density. To reduce the thickness of the armature 140 in the magnetic airgap 144, the coils 141, 142, 145 could be bent during manufacturing such that the spaces 143 in the center of the coils 141, 142, 145 are filled by the adjacent coils. This would allow doubling the winding density and reduce the required airgap 144 by a factor of two.

An alternate configuration for manufacturing a high-density air core armature in accordance with the invention is shown in FIGS. 9A and 9B. In this case, the windings of the armature are square-wave serpentines that are wound together in an interleaved pattern, as shown in FIG. 9A, with three phase windings 151, 152, 153 wound together in an armature structure such that the active lengths 154 achieve a high density. End turns 155 are located outside the magnetic airgap. Overlapping of the windings 151, 152,153 in the end turns 155 does not cause an increase in the active length portion 154 and the required magnetic airgap. The thickness of the end turn portion 155 is greater than the thickness of the active length portion 154 in the direction of the magnetic airgap.

Figure 10:
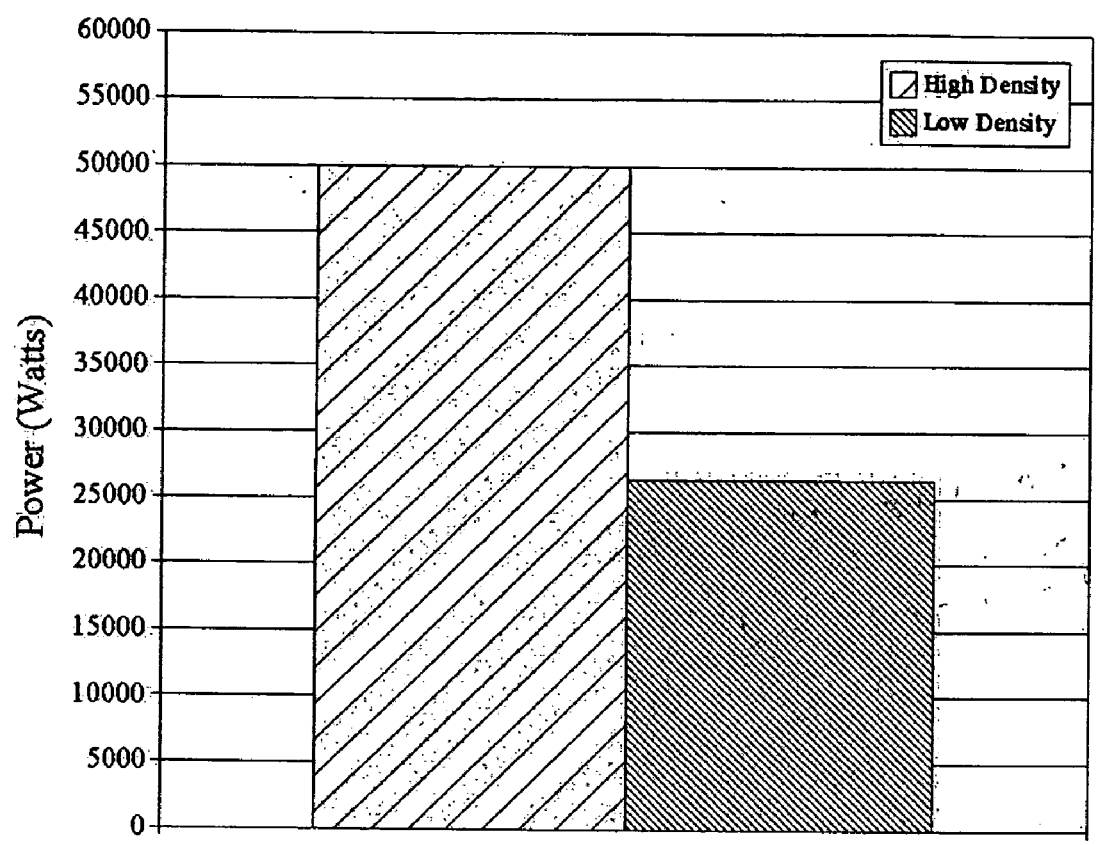
FIG. 10 is a bar chart comparing power generation between low density and high density windings.

The benefit of employing such a high density air core armature is a substantial increase in the generator power capability for a given level of efficiency. Power generated in two identical generators, except for the air core armatures, is compared in the bar chart of FIG. 10. The difference is primarily that the low density armature generator requires an increased magnetic airgap to accommodate the thicker armature. With both generators producing power at 95% efficiency, the high density wound generator provides nearly double the output power. This armature construction yields a substantial reduction in the cost per power generation of the generator.

Although the air core armature can be constructed by several means, it is desirable that the windings be well supported for transfer of the very large torque, especially if directly driven at low rotational speeds. It is also desirable that the winding process be rapid to achieve low manufacturing costs. Air core armature constructions in accordance with the invention are shown in FIGS. 11A, 11B, 11C. The armature 160 comprises active length windings 161 that are wound onto and bonded to a substantially nonmagnetic thin form 162. A preferred material for the form construction is fiberglass laminate because it is durable and readily available in cured sheets. Shown from a side view in FIG. 11B, the armature can be wound such that the active length windings 161 are on one side of the form 162 and the end turns 163 are located on the opposite side. The active length windings 161 are those that are located in the magnetic airgap and generate power. The end turns 163 circumferentially connect the active lengths 161. It is also possible to stack multiple layers of armatures for increased power generation, as shown in FIG. 11C. The two armature forms 162 are stacked together such that the active lengths 161 lie together. This minimizes the thickness of the armature 160. The end turns 163 are located facing outward. A secondary benefit of this construction is that the active lengths 161 are shielded for protection by the forms 162. A support mount 164 can be use to connect the forms 162 together and also allow fro easy mounting in the generator.

A generator 170 utilizing a double stack air core armature, shown in FIG. 12, includes two annular generator rotor portions 171, 172 that have circumferential arrays of multiple alternating polarity magnetic poles 174, 175. The generator rotor portions 171, 172 are held apart by a generator hub 173 in a configuration similar to FIG. 4. The magnetic poles 174, 175 drive magnetic flux 185 back and forth between the magnetic poles 174, 175 and across the magnetic airgap 184. A stationary air core armature 176 is located in the magnetic airgap 184. The armature 176 has two fiberglass forms 177, 178 that are connected by a support mount 179. The armature comprises active lengths 182, 183 that are located in the magnetic airgap 184 and generate power as the rotor portions 171, 172 rotate past. The armature 176 also comprises end turns 180, 181 that are located outside of the magnetic airgap 184.

Figure 13A:
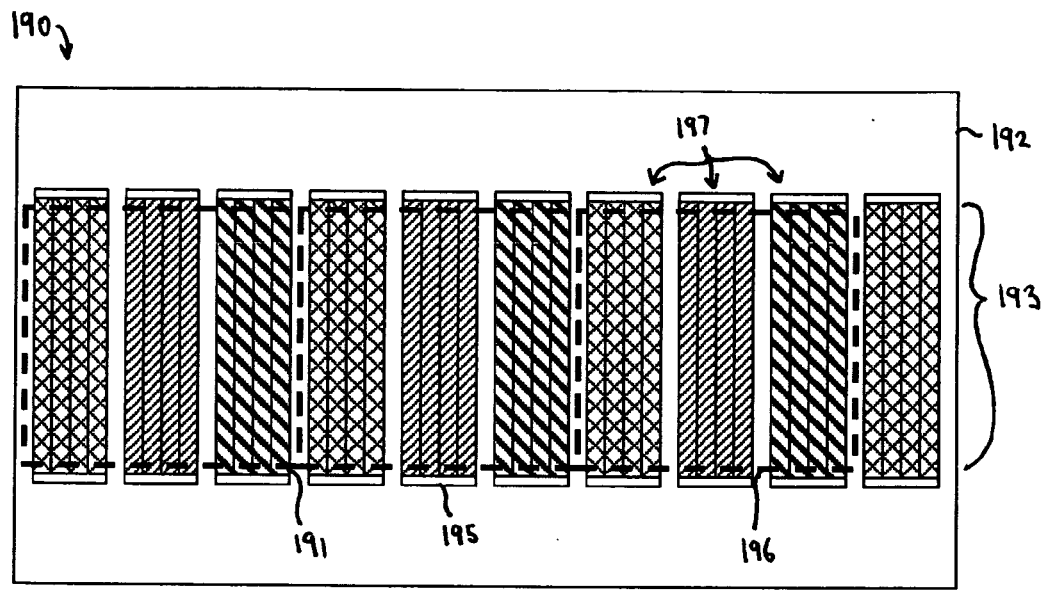
FIG. 13A is a circumferential section of one side of a windings layout of an air core armature in accordance with the invention.
Figure 13B:
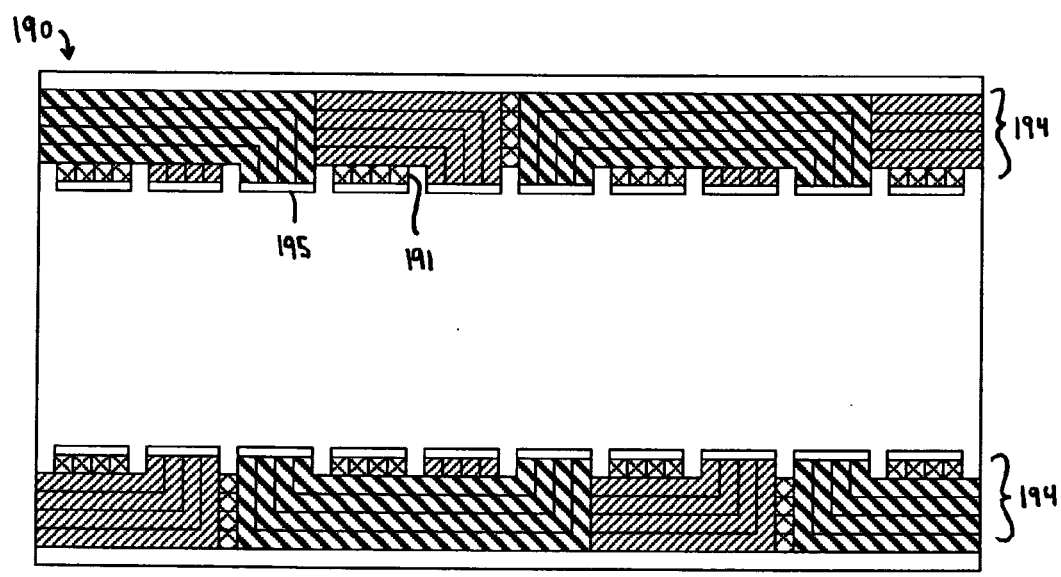
FIG. 13B is a circumferential section of the other side of the air core armature shown in FIG. 13A.

The two opposite sides of a cylindrical air core armature 190 are shown in circumferential sections in FIGS. 13A and 13B. The armature 190, suitable for radial airgap generators such as the one shown in FIG. 5, is comprised of multiple phase windings 191 that are wound onto and bonded to a fiberglass form 192. The windings comprise active lengths 193 and end turns 194. The end turns traverse predominately circumferentially and the active lengths traverse predominately non-circumferentially and perpendicular to the direction of the magnetic airgap. As shown the windings are wound in a serpentine path around the circumference of the armature 190. The windings 191 pass through slots in the form 192 when traversing between active lengths 193 and end turns 194. As shown, the windings 191 comprises threes phase windings 197 in a trapezoidal back emf arrangement. The magnetic poles have a circumferential width covering all three-phase windings 197 at a given time. The slots in the form can be easily and accurately made using CNC laser or waterjet cutting, or by other means. This armature could also be made for an axial airgap generator, such as those shown in FIGS. 2–4, by winding onto a flat, disk-shaped form. The active lengths lie radially on an axial airgap armature, but the construction is otherwise the same.

Figure 14A:
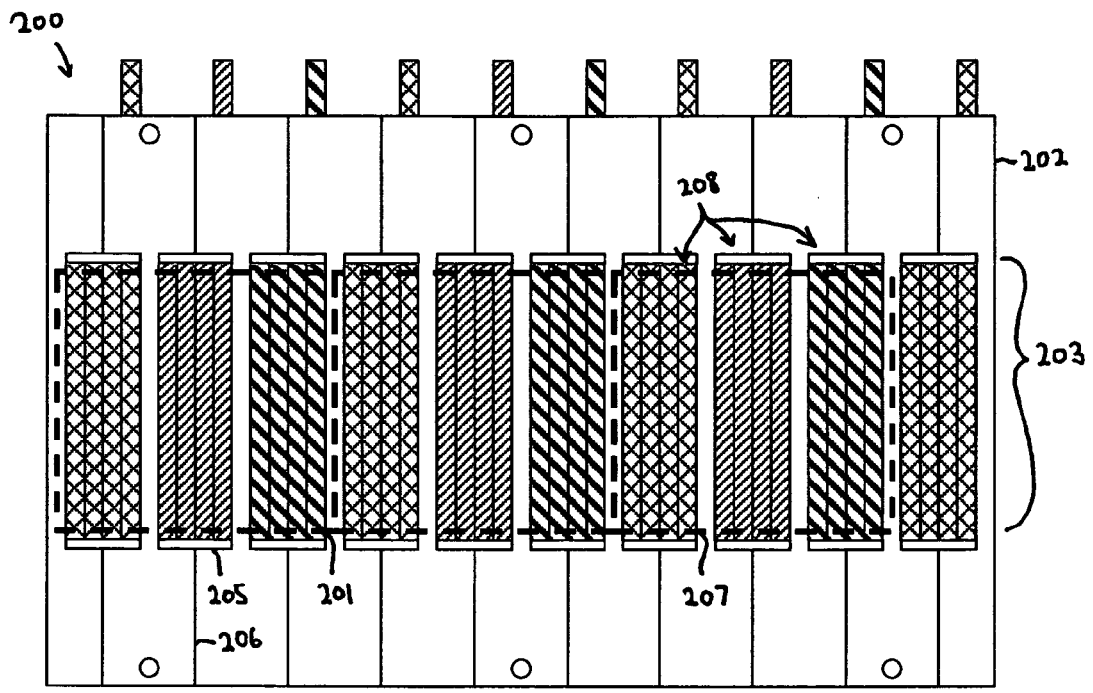
FIG. 14A is a circumferential section of one side of an alternate configuration windings layout of an air core armature in accordance with the invention.
Figure 14B:
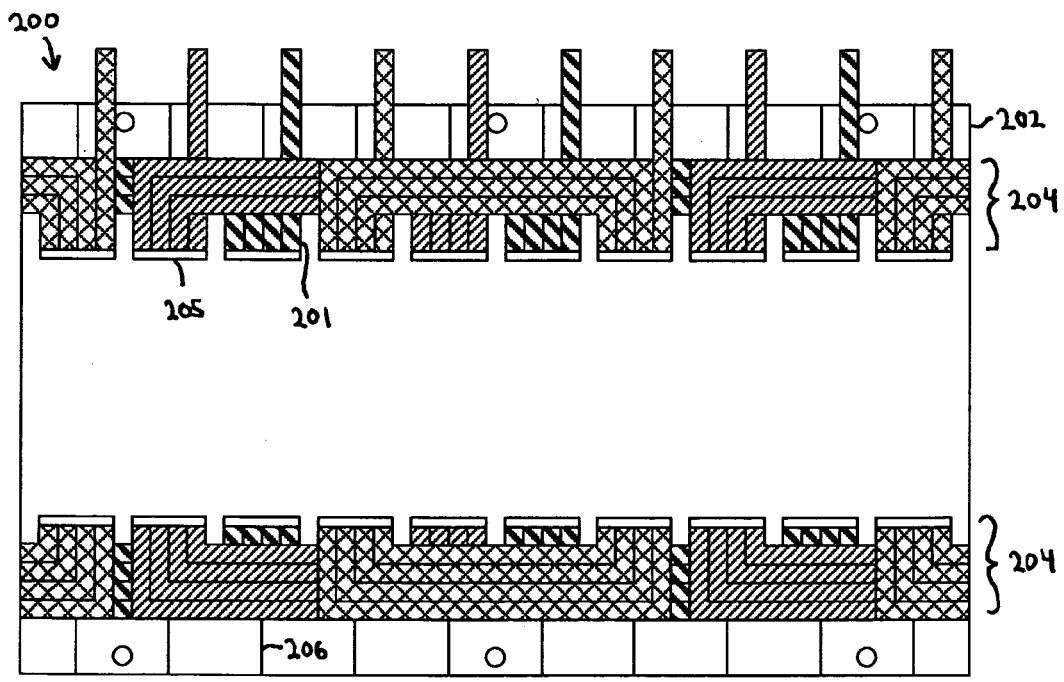
FIG. 14B is a circumferential section of the other side of windings layout of the air core armature shown in FIG. 14A.

A circumferential section (both sides) of an alternate configuration windings layout of an air core armature in accordance with the invention is shown in FIGS. 14A and 14B. In this case, the windings are wound as coils instead of serpentine paths. The armature 200 is constructed of multiple phase windings 201 that are wound onto and bonded to a fiberglass form 202. The windings 201 include active lengths 203 and end turns 204, which lie on opposite sides of the form 202. This prevents overlapping of the end turns 204 from resulting in increased thickness of the active lengths 203. The windings 201 pass through slots 205 in the form when traversing between active lengths 203 and end turns 204. To facilitate winding, the form 202 has slits 206, communication between the edges of the form 202 and the slots 205, that allow the windings to be wound without threading them through the slots 205. Again, the width of the magnetic poles 207 of the generator is approximately equal to the total width of the phases 208.

Figure 15A:
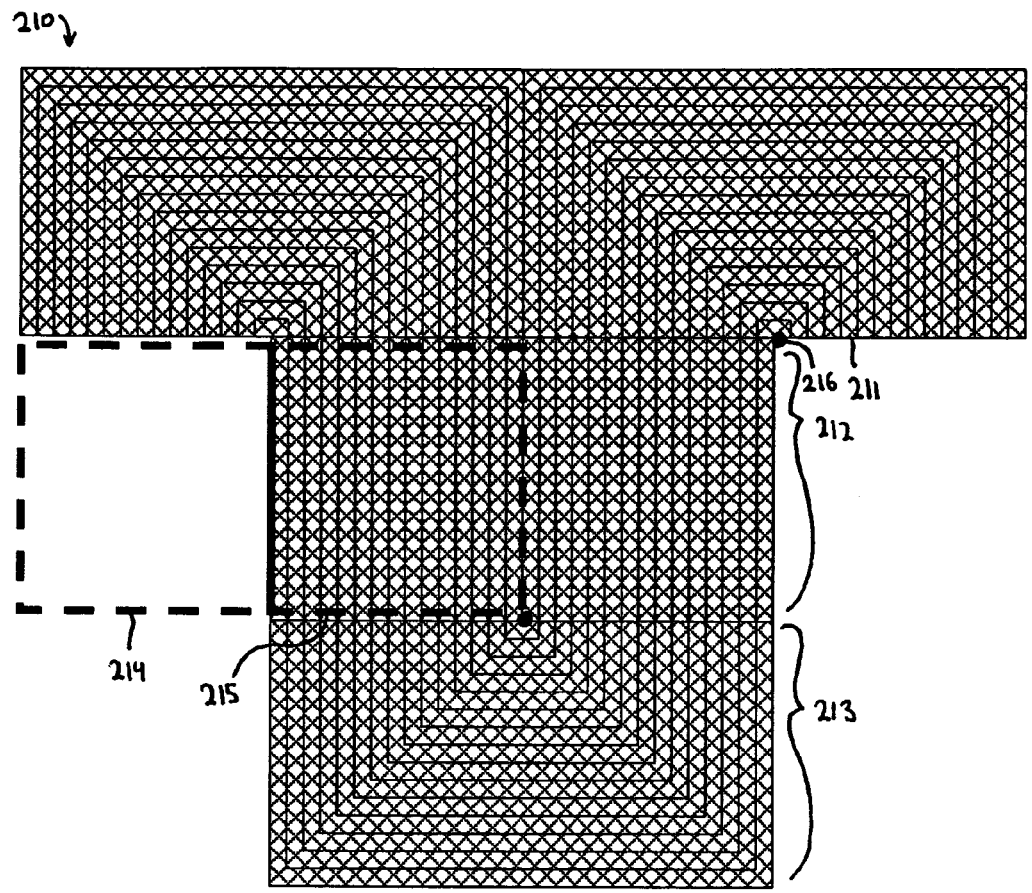
FIG. 15A is a circumferential section a portion of a second alternate configuration windings layout of an air core armature in accordance with the invention.
Figure 15B:
FIG. 15B is a schematic drawing of a circumferential section of a second alternate configuration windings layout of an air core armature with multiple stacked layers in accordance with the invention.

A circumferential section of a portion of a second alternate configuration windings layout of an air core armature that is wound in a configuration to produce a sinusoidal back emf is shown in FIG. 15A. In this construction, the armature 210 is wound with windings 211 such that a single phase occupies a complete layer. The windings comprise active lengths 212 and end turns 213. When wound using a square-wave serpentine path, overlapping of end turns 213 is eliminated. The winding can be done on top of a form using pins 216 to hold the windings 211 in place. Alternatively, adhesive or a film adhesive layer can be used to hold the windings 211 in place while winding. The active lengths of a single direction of a single phase, which may be serially or parallel connected together, have a circumferential width approximately equal to the width of the magnetic poles 214, 215 of the generator rotor. Multiple phases are added by stacking each phase in layers. An air core armature with multiple stacked layers is shown in FIG. 15B. The armature 220 has three phases 221, 222, 223 that are stacked in the direction of the magnetic airgap of the generator. Each phase 221, 222, 223 has active lengths traversing in opposite directions 224, 225. Each phase 221, 222, 223 is shifted and in angular position such that it generates power with different phasing with respect to the other phase windings.

The windings of the air core armature can be wound with conventional solid conductor wire, however, this is less desirable in many cases. For larger generators, the conductor diameter can become large and makes the winding process very difficult because the conductors do not easily bend. Another problem arises from use of solid conductor wire in that substantial eddy current losses can occur. Unlike conventional slot wound generators, the magnetic flux in the invention passes directly through the conductors of the armature for generation of power. The larger the wire diameter, the greater the magnetic eddy current losses that could be generated. The armature is therefore preferably wound using Litz wire or multiple individually insulated strand conductor wire. The same cross sectional wire area can be achieved but the diameter of the strands is greatly reduced, reducing the losses. Normally Litz wire is employed for very high frequency applications, greater than 100,000 Hz in many cases. Wind turbines generators are very low frequency generators of less than 100 Hz, in many cases. However, because of the extremely large amount of magnetic flux that passes through the very large amount windings of the generator, substantial magnetic losses could be generated even at such low frequency operation. Use of the Litz wire reduces those losses and also facilitates much easier winding of the armature due the increased flexibility.

Figure 16A:
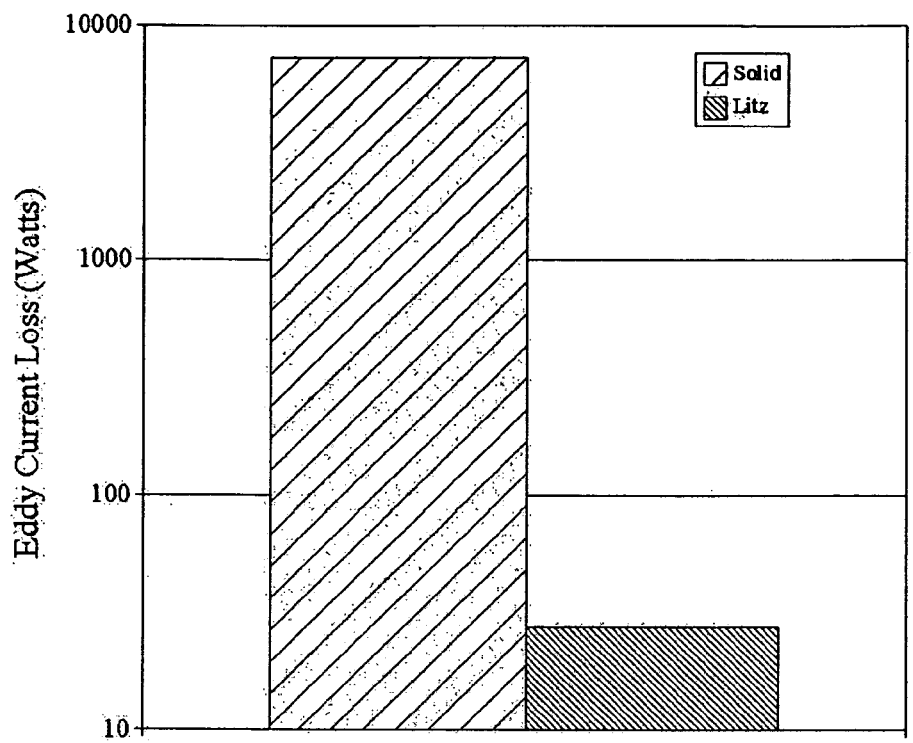
FIG. 16A is a bar chart comparing eddy current power loss in a generator using solid conductors and Litz wire conductors.
Figure 16B:
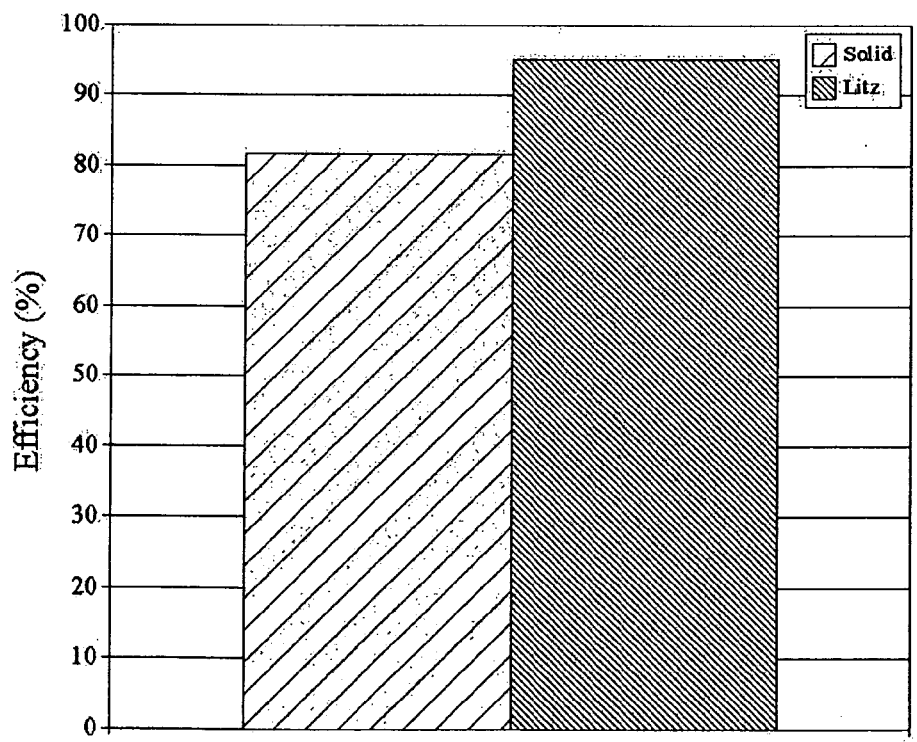
FIG. 16B is a bar chart comparing generator efficiency in generators using solid conductors and Litz wire conductors.
Figure 16C:
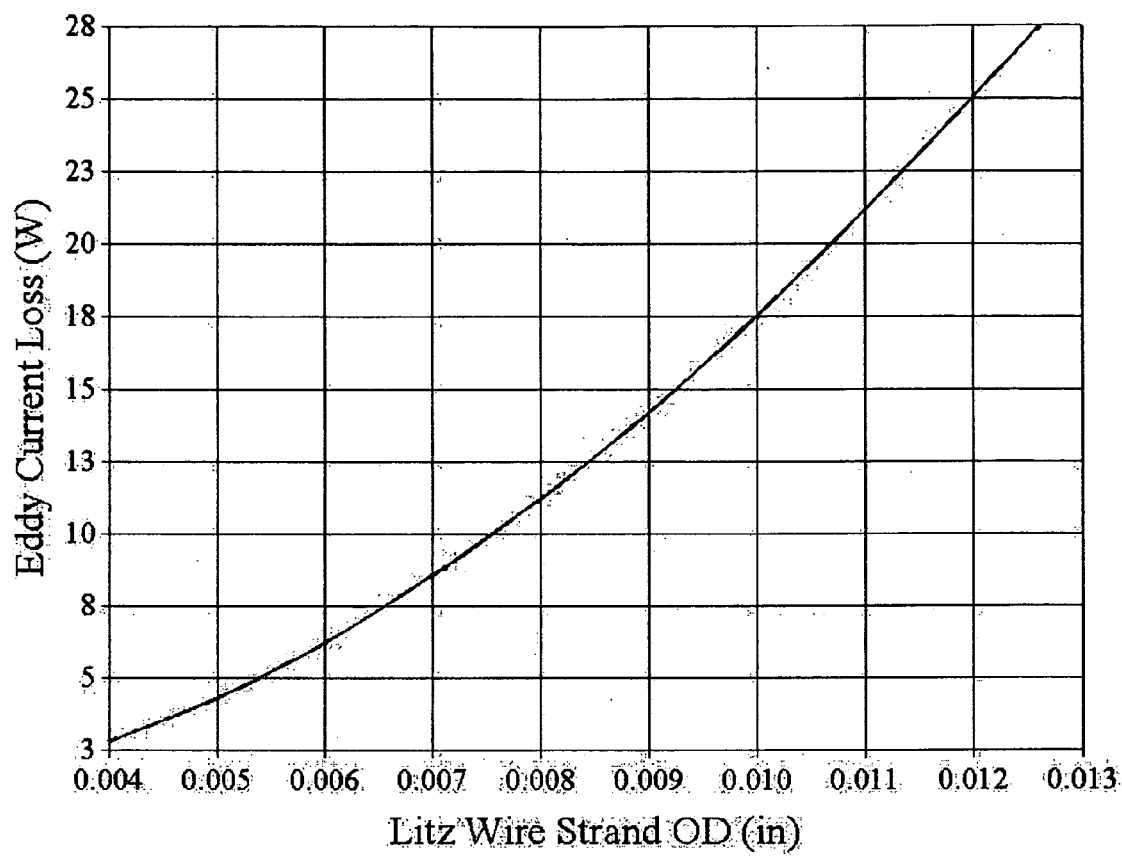
FIG. 16C is a graph showing eddy current power loss versus Litz wire strand diameter for a particular generator in accordance with the invention.

A comparison of eddy current power loss in a generator using solid conductors and a generator using Litz wire conductors is shown in FIG. 16A. Both generators provide 50 kW power capability with the same designs. However, one generator uses solid conductor wire while the other uses multiple individually insulated strand conductor wire. The insulation on the individual strands prevents eddy current conduction between the strands. The solid conductor generator has eddy current losses of 7320 watts while the Litz wound generator has eddy current losses of only 27 watts. The eddy current losses are substantial and they can significantly impact the overall operating efficiency. A comparison of total generator efficiency between the two generators is shown in FIG. 16B. The solid conductor generator is roughly 82% efficient and the Litz conductor generator reaches approximately 95% efficiency, both at 50 kW power generation. Eddy current power loss versus Litz wire strand diameter for the generator is shown in FIG. 16C. The strand diameter need not be extremely small to acceptably limit losses due to the low rotational speed and frequency.

Figure 17A:
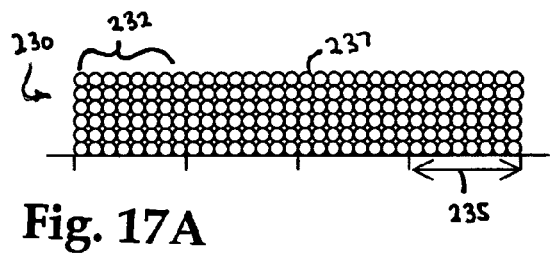
FIGS. 17A and 17B are schematic drawings of compacted air core armatures utilizing Litz wire and solid wire.
Figure 17B:
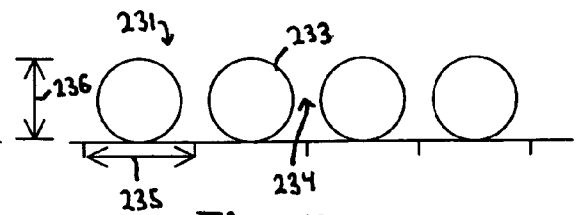

Yet another benefit of using multiple individually insulated strand conductor wire is for increasing the winding density of the active lengths of the windings. A comparison of compacted air core armatures utilizing Litz wire and solid wire is shown in FIGS. 17A and 17B. The solid wire armature 231 is wound with solid conductor wires 233 that have a space 234 between them imparted by the form at the end turns, not shown. The area occupied by a conductor 233 has a height and width 235, 236. The stranded conductor armature 230 uses stranded conductor wire 237, which can be compacted in the active length area for increased density. For the same area of height and width 235, 236, a greater volume of winding cross-sectional area can be achieved.

Figure 18A:
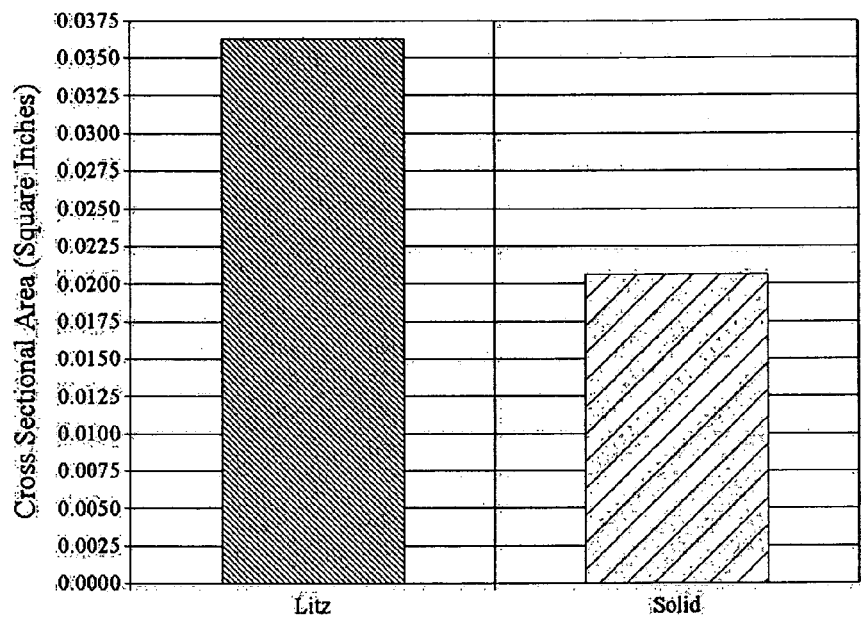
FIG. 18A is a bar chart comparing conductor cross-sectional area between compacted air core armatures utilizing Litz wire and solid wire.
Figure 18B:
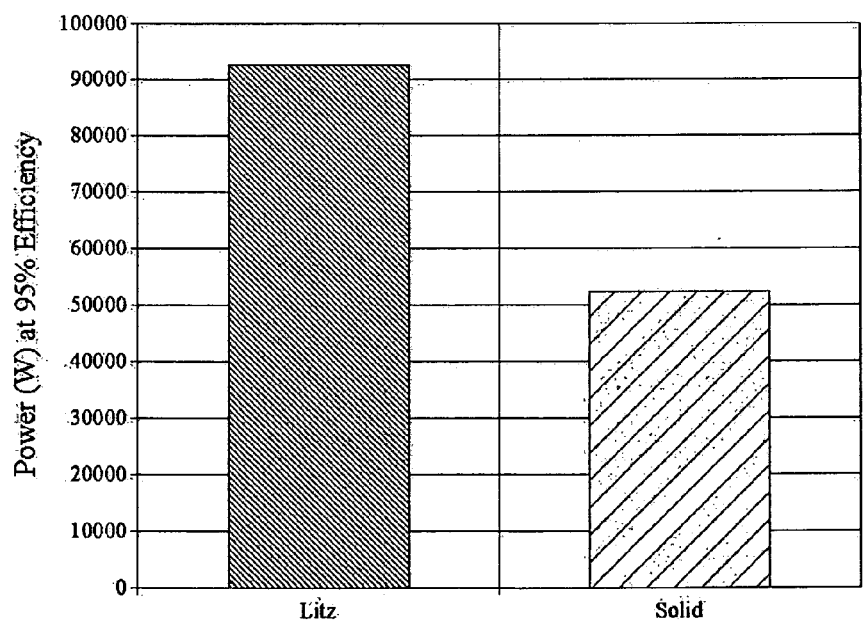
FIG. 18B is a bar chart comparing generator power capability between compacted air core armatures utilizing Litz wire and solid wire.

A comparison of conductor cross-sectional area and power generation between compacted air core armatures utilizing Litz wire and solid wire is shown in the bar charts of FIGS. 18A and 18B. For the same generator with the same magnetic airgap thickness, the Litz wound generator can provide approximately 75% more conductor cross-sectional area. As a result, the compacted Litz generator can generate roughly 75% more power than the solid conductor generator. Eddy current losses were not included and both generators operate at the given power levels with 95% efficiency. The benefits of using both stranded conductor wire and of compacting the strands can provide a substantial improvement in power capability and/or reduction of costs for a given power generator.

Figure 19:
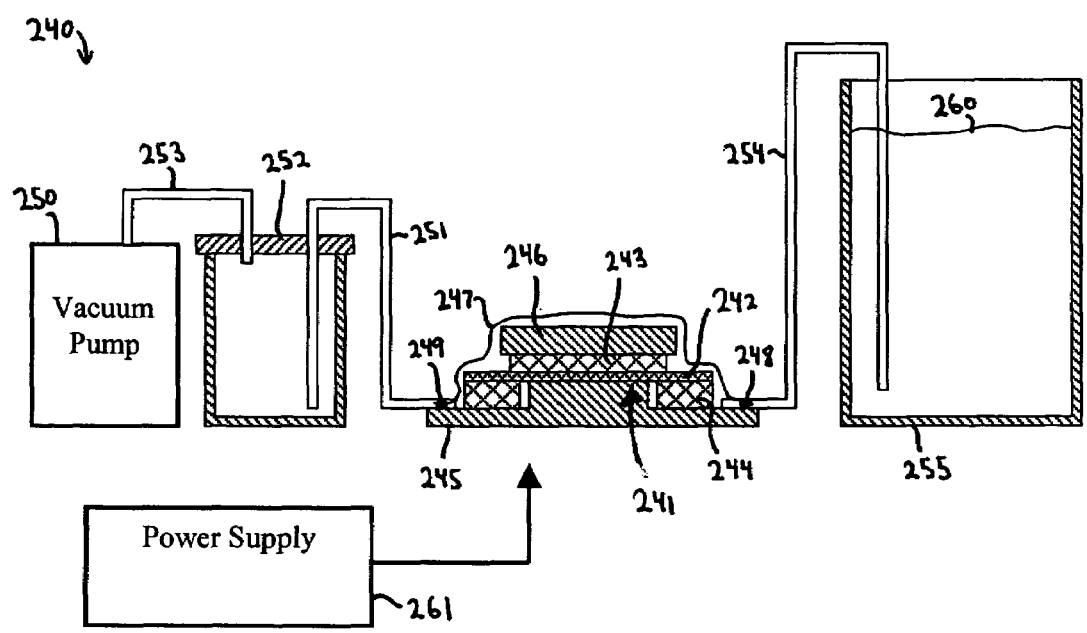
FIG. 19 is a schematic drawing of an apparatus for fabricating air core armatures by a process in accordance with the invention.

Because of the large size of many wind turbine ring generators for generating power at low rotational speeds, manufacturing of the armature can be difficult. Difficulties arise from obtaining the manufacturing equipment and for producing adequate tolerance armature dimensions. An apparatus 240 for performing a preferred air core armature fabrication process, illustrated in FIG. 19, impregnates and bonds the air core armature into a rigid structure. The armature 241 has active lengths 243 and end turns 244 that are wound on to a form 242. The armature 241 is placed on rigid tooling 245 and a top tooling plate 246 may also be utilized to more uniformly flatten the active lengths 243. The armature 241 is enclosed by a flexible film layer or vacuum bag 247 and is sealed with sealant tape 248, 249. A vacuum pump 250 is used to evacuate the bag 247, which compacts the windings to the tooling with a uniform force exerted by roughly 15 psi atmospheric pressure. Use of a mechanical press to generate such compaction force would not be practical, and uniform pressure could not be exerted. Once evacuated, a resin hose 254 connected between the armature 241 and a container 255 of resin 260 is opened, allowing resin to flow into and impregnate the armature 241. Multiple hoses 254 can be provided as needed to ensure good impregnation around the diameter of the armature 241. The vacuum line 251 connects the armature 241 to a resin waste pot 252 and a vacuum pump line 253 connects the pot 252 to the vacuum pump. Once impregnated with resin, the armature 241 is cured. Heat can be applied externally to speed curing or alternatively a power supply 261 can be coupled to the armature windings to generate heat through resistive heating of the actual windings. After it is cured, the rigid armature 241 is removed from the bag 247 and tooling 245, 246 and is ready for generator installation. Although shown impregnated through vacuum assisted resin transfer, resin could alternatively be added prior to evacuation or bondable-coated wire could be used for the windings such that bonding occurs by the application of heat.

To further increase the efficiency of the wind turbine generator it is sometimes possible to increase the number of generator phases and achieve an improvement. Increasing the number of phases from 3 phase to a higher number such as 5 phase can allow for increase instantaneous phase utilization in providing output power. For instance, a higher percentage of the total windings provides power at a given time so the current per winding is reduced along with resistive losses. Air core armatures having high numbers of phases are illustrated in FIGS. 20A, 20B and 20C. A three-phase generator 270 shown in FIG. 20A has three alternating phases 273 per pole width. A five phase generator 271 shown in FIG. 20B has five alternating phases 273 per pole width 274. Likewise, a fifteen pole generator 272 shown in FIG. 20C has fifteen alternating phases per pole width 274. A comparison of generator efficiency versus number of phases is shown in FIG. 20D. Some improvement in efficiency can be achieved by increasing the winding utilization through increased numbers of phases. However, the improvement is also dependent on the actual flux width across the magnetic poles.

Figure 21A:
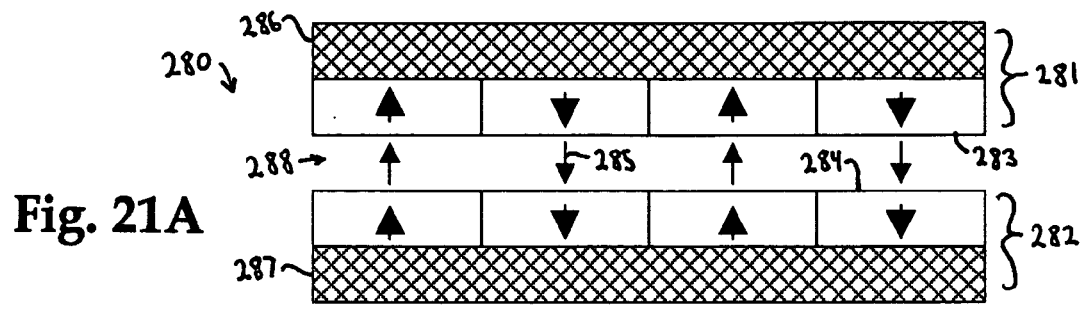
FIG. 21A is a circumferential section of generator rotors without back irons.

The wind turbine generator rotor portions can be constructed from either nonmagnetic or ferromagnetic material. Nonmagnetic materials like aluminum could be used, however they have several drawbacks. They do not allow for easy assembly of the generator magnets since there is no magnetic attraction. Secondly, they do not provide a magnetically efficient flux path between circumferentially adjacent magnets. When the rotor portions are constructed from ferromagnetic material, they serve as back irons for the magnets. Portions of a generator rotor 280 without back irons, shown in circumferential section in FIG. 21A, includes two generator rotor portions 281, 282 that include aluminum portions 286, 287. An array of magnets 283, 284, with alternating polarities, are bonded to the aluminum rotor portions 286, 287 and drive magnetic flux across an airgap 288 between the two generator portions 281, 282.

Figure 21B:
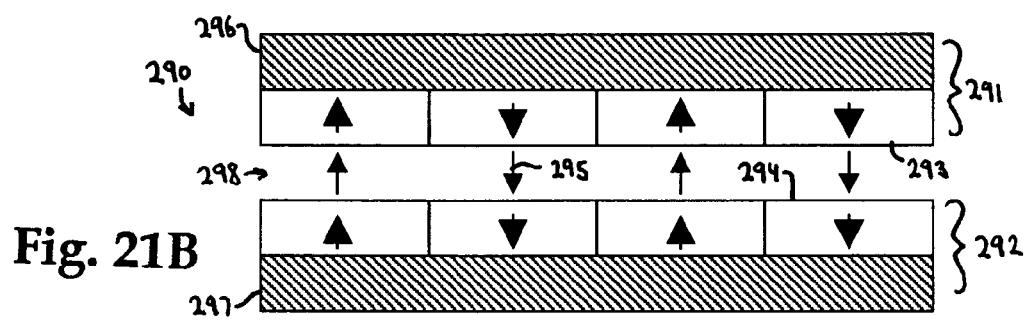
FIG. 21B is a circumferential section of generator rotors with back irons.
Figure 21C:
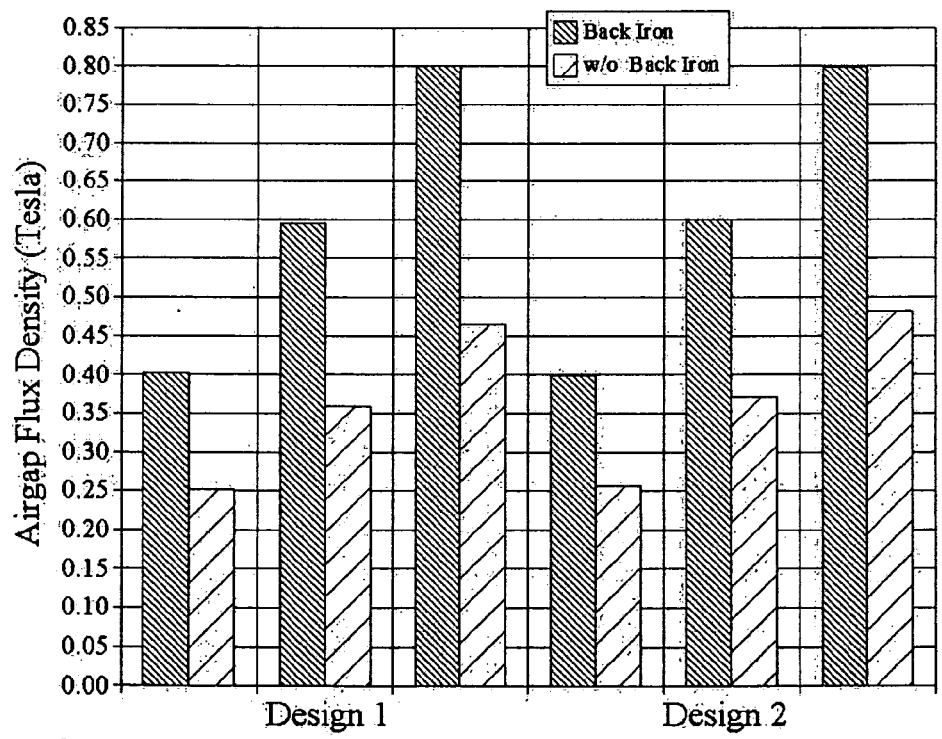
FIG. 21C is a bar chart comparing magnetic air gap flux density between generator rotors with and without back irons.

A back iron design rotor 290, shown in FIG. 21B, is comprised of two rotor portions 291, 292 that include magnets 293, 294 attached to steel back irons 296, 297. The magnets 293, 294 can be held in place by magnetic attraction alone or adhesive can also be applied as well. The magnets 293, 294 drive magnetic flux 295 across the magnetic airgap 298. The back irons provide a much lower reluctance path circumferentially between adjacent magnets. This results in an increased magnetic flux density in the magnetic airgap. A comparison of magnetic air gap flux density between generator rotors with and without back irons is shown in FIG. 21C. The magnetic flux density in the airgap can be increased by as much as 70% by using ferromagnetic back irons. The amount of improvement is a function of the generator design, as shown.

Figure 22:
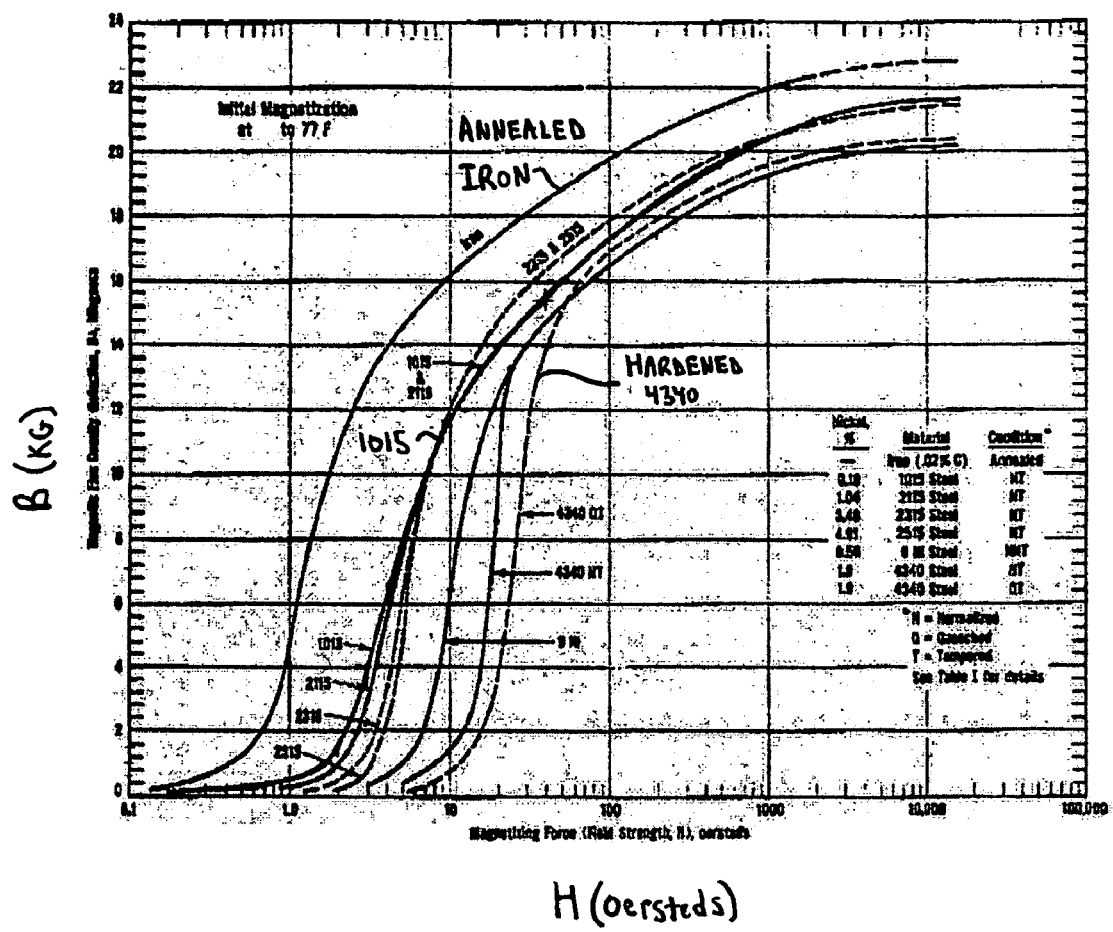
FIG. 22 is a graph showing magnetic properties of different ferromagnetic back iron materials.

The back irons can be constructed of any material that has is ferromagnetic, however some materials such as low carbon steel and iron are preferred for having improved magnetic properties for this application. A graph in FIG. 22 shows B vs. H curves for different ferromagnetic materials. The back iron material preferably has less than 0.3% carbon and more preferably less than 0.1%. Likewise, the back irons are preferably fabricated in a low hardened conditioned, such as annealed. Increasing the magnetic permeability of the material increases the flux density in the magnetic airgap. Increasing the saturation flux density of the material allows for use of thinner back irons, which reduces the generator weight.

In many cases the back iron in the generator can have a preferred thickness, selected to balance between weight and performance. The permanent magnets are attached to ferromagnetic back irons that have a thickness in inches, z. The magnetic airgap has a thickness in the direction of flux in inches, y. The permanent magnets of both rotors combined have a total thickness in the direction of flux in inches, 2x. The circumferential array of multiple alternating magnetic poles has an inner diameter in inches, ID. The preferred number, n, of magnetic poles around the circumference of one of the generator rotor portions is such that $0.3 \leq ((0.029 \, z \times n)/(y \, ID)) \leq 1.5$.

Figure 23A:
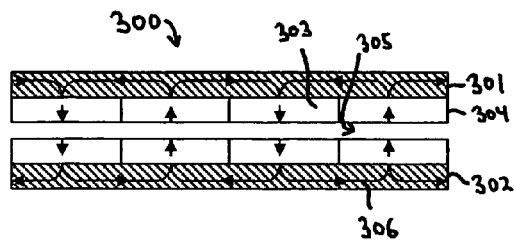
FIG. 23A is a circumferential section of a portion of a generator rotor utilizing alternating polarity permanent magnet poles.

In the preferred configuration of a generator in accordance with the invention, the circumferential array of multiple alternating polarity magnetic poles is constructed from alternating polarity permanent magnets, as shown in FIG. 23A. The alternating polarity permanent magnet generator 300 uses alternating polarity magnets 303, 304 attached to back iron rotor portions 301, 301 with an airgap 305 in the middle. Magnetic flux 306 connects the magnetic poles 303, 304 circumferentially in the back irons or rotor portions 301, 302.

Figure 23B:
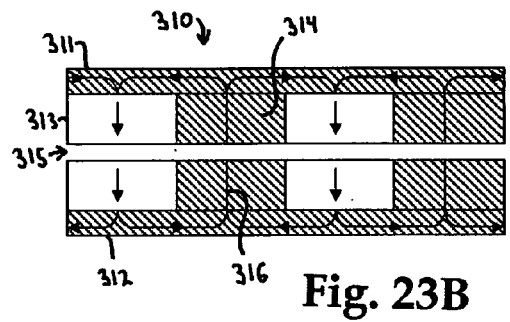
FIG. 23B is a circumferential section of a portion of a generator rotor utilizing permanent magnet and consequence poles.
Figure 23C:
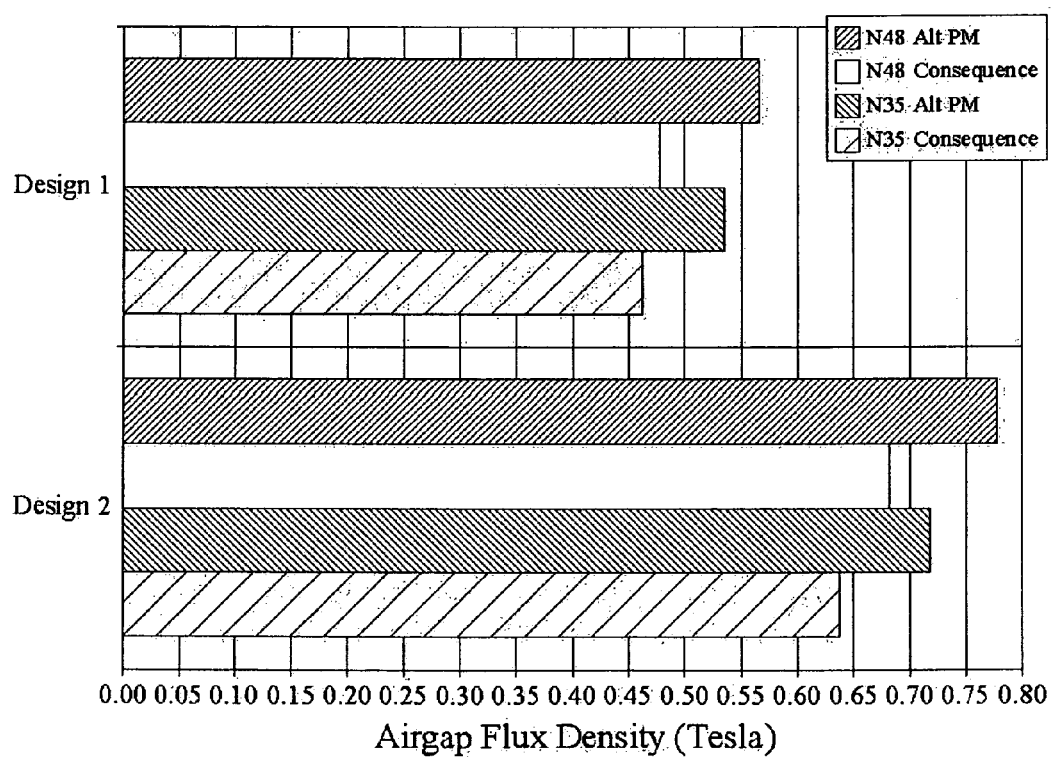
FIG. 23C is bar chart comparing magnetic air gap flux density between generator rotors having alternating polarity permanent magnet poles and generator rotors having permanent magnet and consequence poles.

However, it is also possible to configure a generator to use an array of spaced, like-polarity, permanent magnets along with steel consequence poles between the magnets, to produce a consequence pole generator 310, shown in FIG. 23B having spaced, like pole magnets 313 attached to rotor back irons 311, 312. Between the magnets 313 are steel poles 314 that, by consequence, form the alternating poles. To employ the same amount of magnet material the magnets 313 must be made twice as tall as the magnets 303, 304 of the alternating polarity permanent magnet design shown in FIG. 23A. The steel poles 314 are also made equally tall. As a result, the generator becomes much heavier. A secondary result of consequence poles is a reduction in the airgap flux density. A comparison of magnetic air gap flux density between generator rotors alternating polarity permanent magnet poles (FIG. 23A) and permanent magnet and consequence poles (FIG. 23B) is shown in FIG. 23C. For the designs shown, the magnetic flux density is about 13% lower for the same amount of magnet material when using a consequence pole design.

Figure 24A:
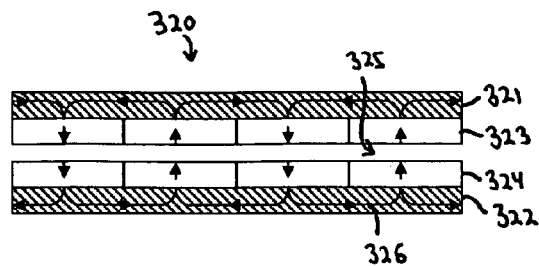
FIGS. 24A and 24B are circumferential sections of generators utilizing a double-sided magnet rotor and a single sided magnet rotor.
Figure 24B:
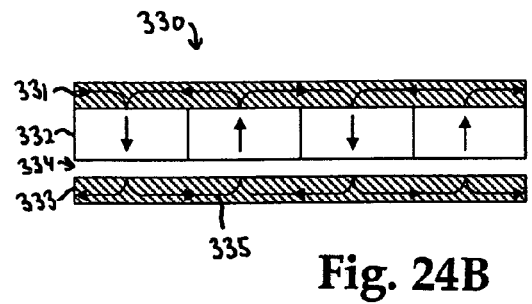
Figure 24C:
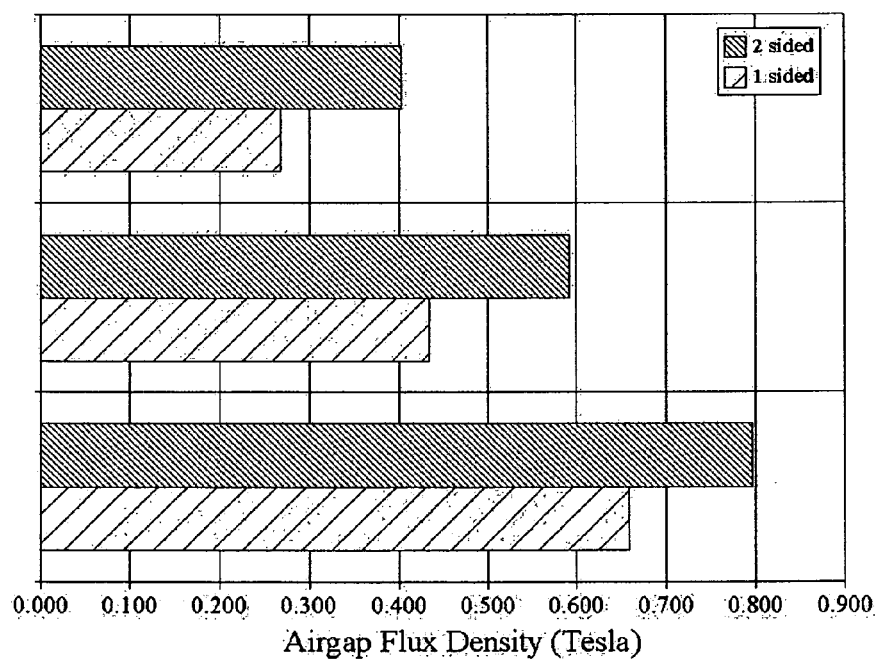
FIG. 24C is a bar chart comparing magnetic air gap flux density between generators utilizing single sided and double sided magnet rotors.

The preferred wind turbine generator configuration is to utilize permanent magnets for poles on both generator rotor portions, however it is also possible to use magnets on only one side. This reduces the number of magnets. Circumferential sections of generators utilizing single sided and double sided magnet rotors are shown in FIGS. 24A and 24B. The double-sided magnet rotor generator 320 shown in FIG. 24A uses ferromagnetic rotor portions 321, 322 with attached circumferential arrays of multiple alternating polarity permanent magnets 323, 324. The magnets 323, 324 drive flux across the airgap and the flux 326 circumferentially connects adjacent magnets. In the single sided magnet rotor generator 330 shown in FIG. 24B, the generator comprises two ferromagnetic rotor portions 331 and 333. A circumferential array of alternating polarity permanent magnets 332 is attached to one rotor portion 331 to form the magnetic poles. The magnetic poles of the other rotor portion 335 are formed by consequence due to the magnetic flux 335 circumferentially looping through the rotor portion 335 before traversing back across the airgap 334. Although both designs can utilize the same amount of magnet material and have the same generator weight, use of the double-sided magnet rotor provides a higher airgap magnetic flux density. A comparison of magnetic air gap flux density between generators utilizing single sided and double sided magnet rotors is shown in FIG. 24C. The double-sided magnet rotor design can provide a 45% increase in flux density for the same amount of magnet material, depending on the generator design.

Figure 25A:
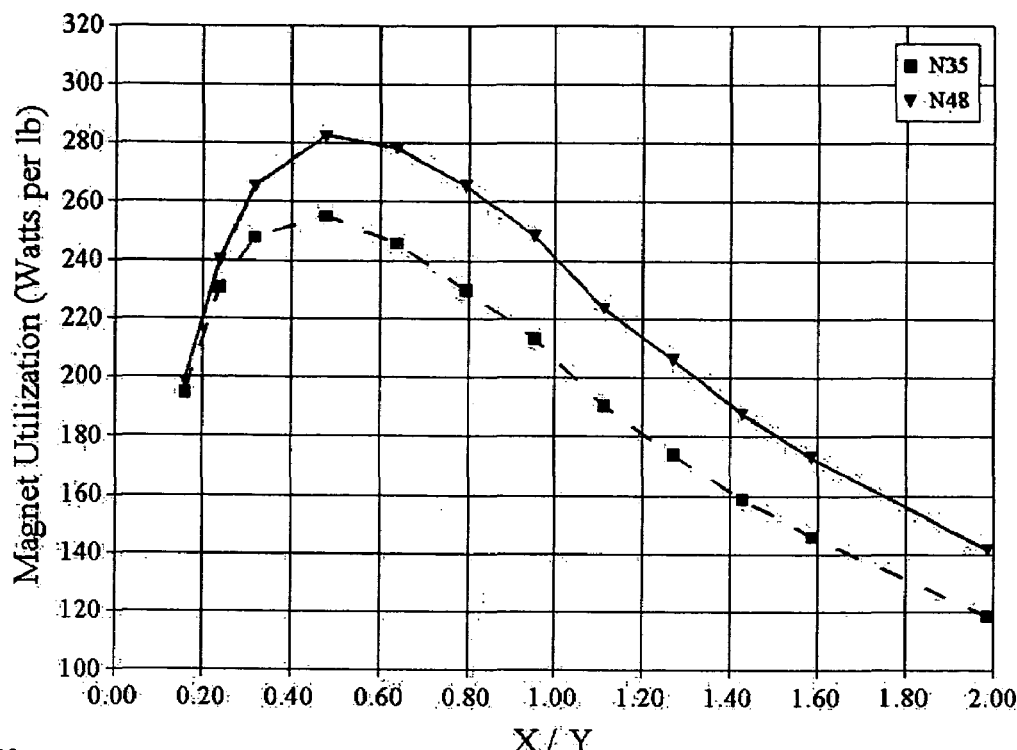
FIG. 25A is a graph showing magnet utilization versus generator rotor dimensions.
Figure 25B:
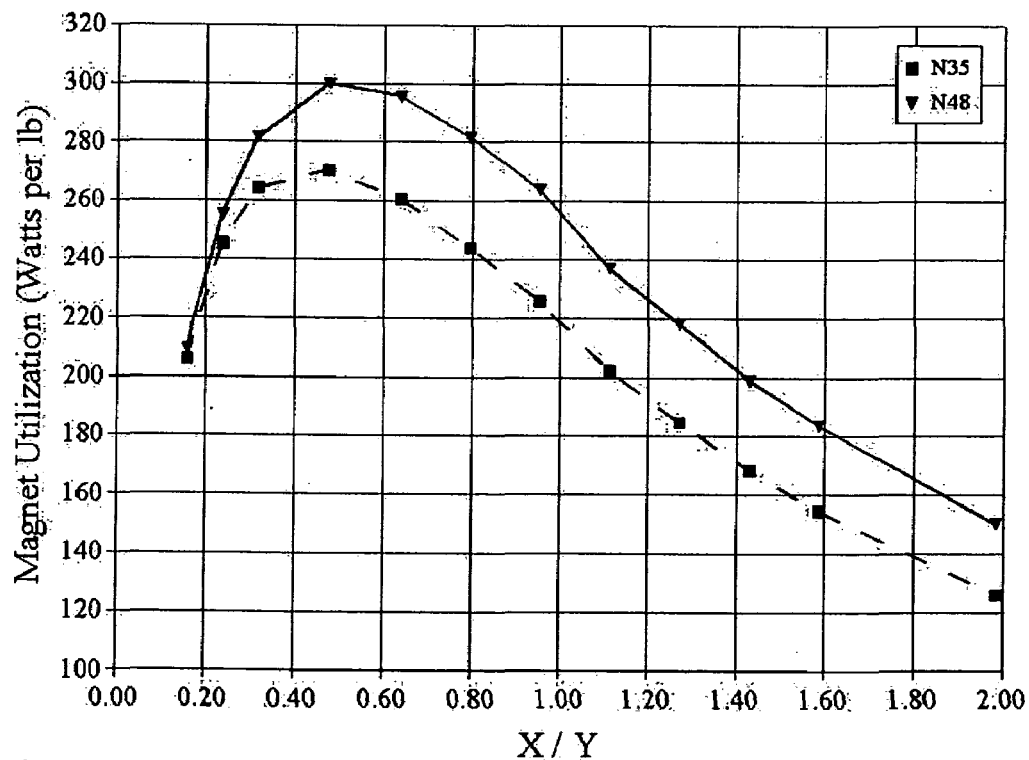
FIG. 25B is a graph showing magnet utilization versus generator rotor dimensions for a second generator design.

It has been found that for many generators, the power generation can be maximized per amount of permanent magnet material through specific design parameters. For instance, if the thickness of the airgap in inches is given by y and the thickness of the magnets on each rotor in inches is defined as x, then their exists a preferred ration of x/y for increased magnet utilization. For a generator with all the magnets on one rotor, then the thickness of the magnets would be defined as 2 x, accordingly. Magnet utilization versus generator rotor dimensions is shown in FIGS. 25A and 25B for two different generator designs with different grade magnets. From the plots, it can be seen that the preferred ratio of x/y is between 0.20 and 1.0. It can also be seen that the optimum ratio is not significantly influenced by the grade of NdFeB magnet.

Figure 26A:
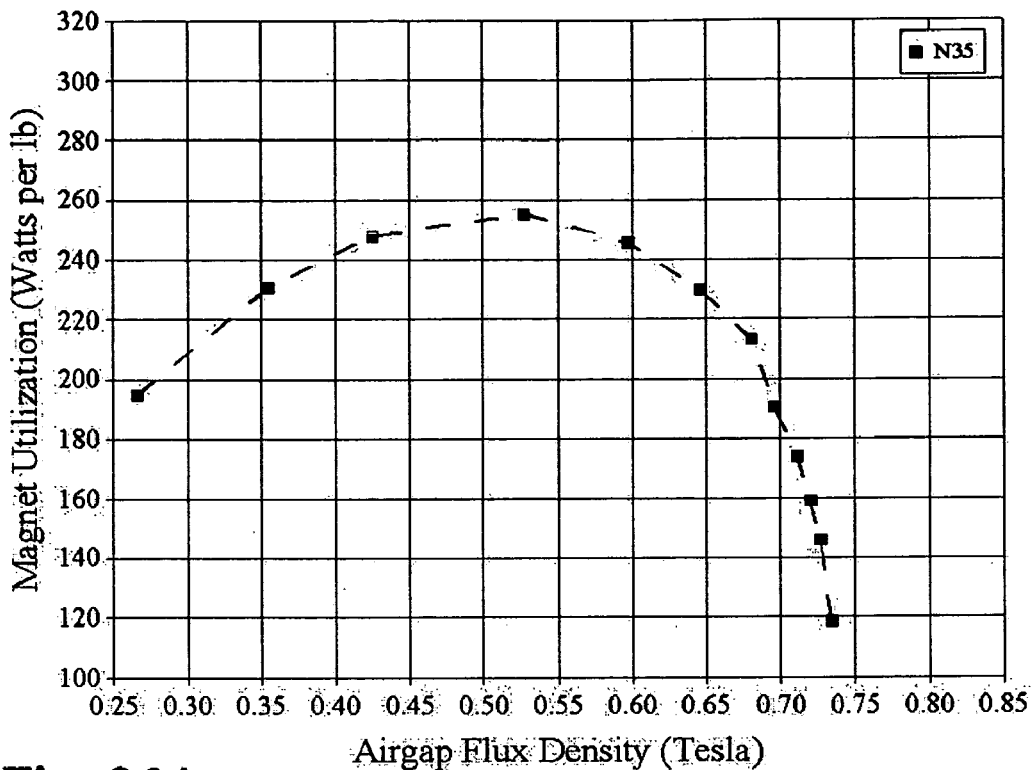
FIG. 26A is a graph showing magnet utilization versus generator airgap flux density.
Figure 26B:
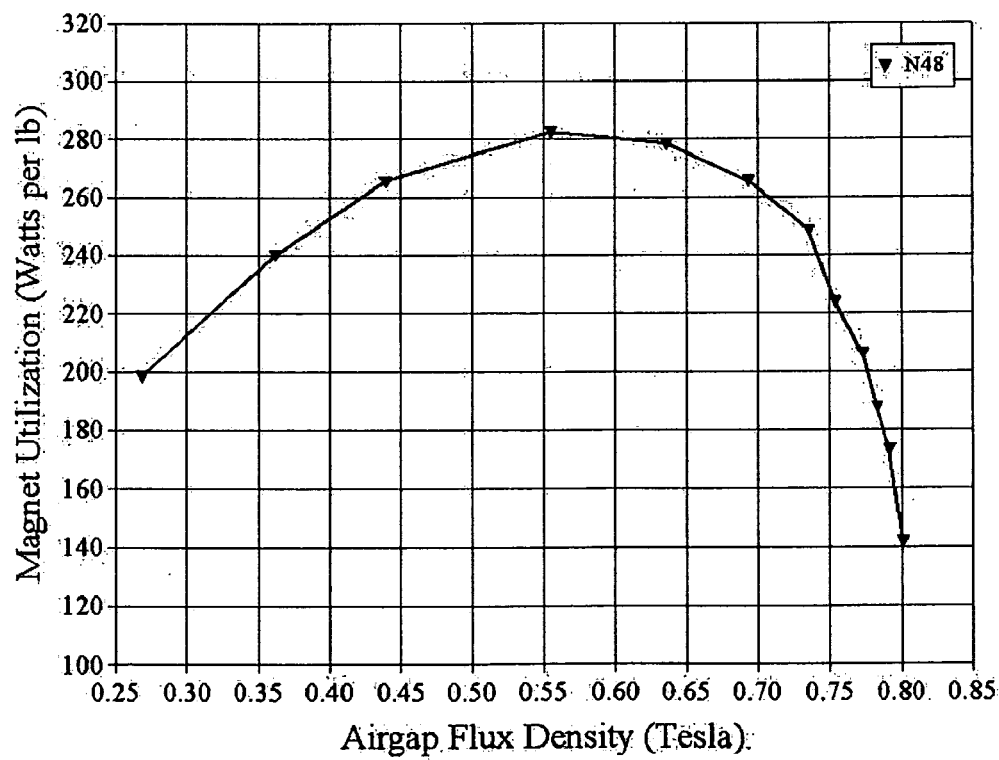
FIG. 26B is a graph showing magnet utilization versus generator airgap flux density for a second generator design.
Figure 27:
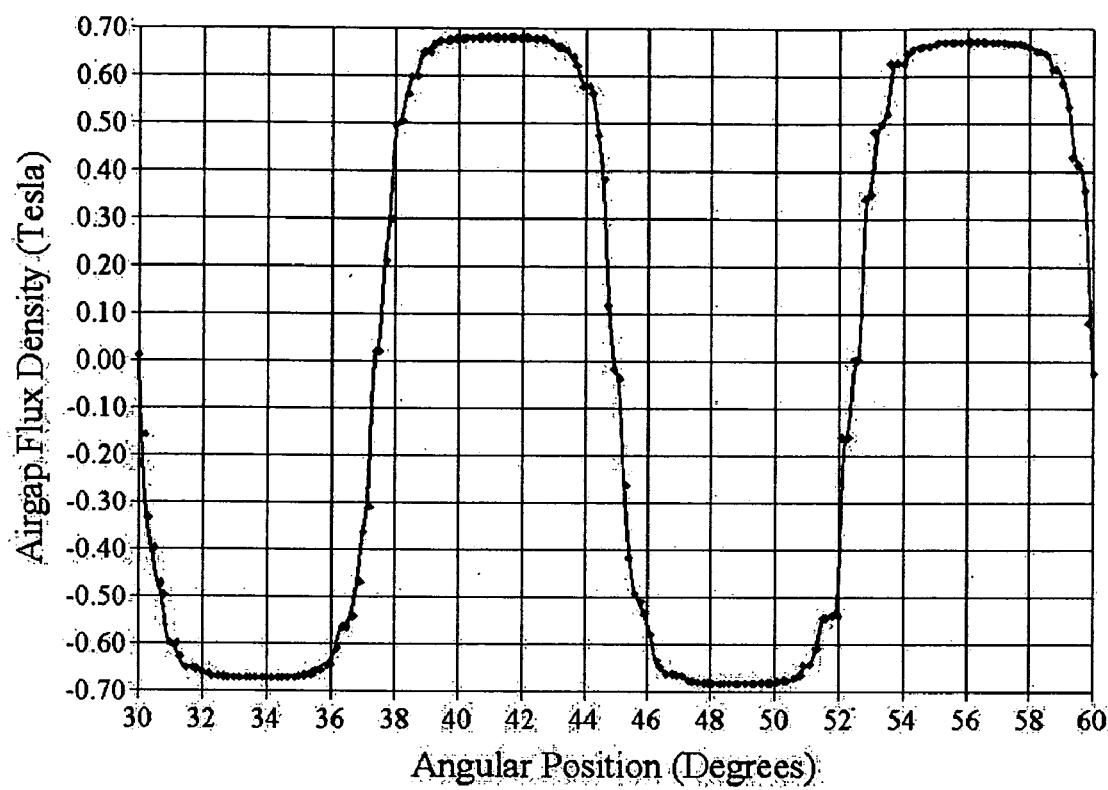
FIG. 27 is a graph showing airgap flux density in a generator airgap distribution versus angular position.

An optimum airgap flux density can also be found for a large percentage of generators. Magnet utilization versus generator airgap flux density for two different generator designs and magnet grades are shown in FIGS. 26A and 26B. From these plots, the optimum maximum airgap flux density, B, is preferably between 0.3 and 0.7 Tesla. The airgap flux density distribution with angular position, indicated in FIG. 27, shows that the maximum flux density occurs at the center of a given magnetic pole.

Figure 28A:
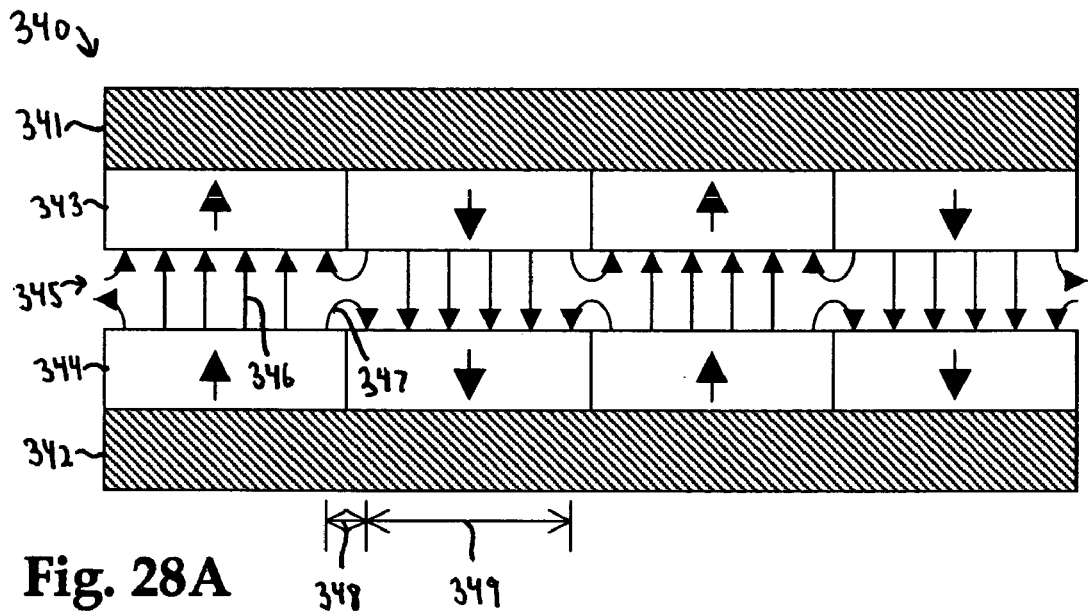
FIGS. 28A and 28B are circumferential sections of generator rotors utilizing abutted magnets and circumferentially spaced magnets, respectively.
Figure 28B:
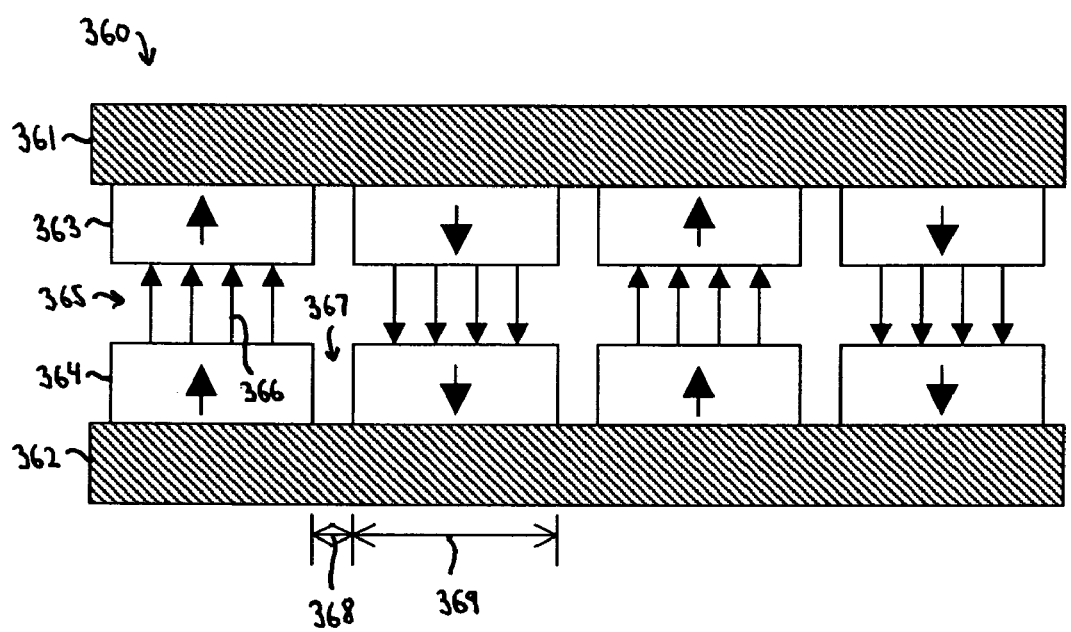

One issue affecting the performance of the wind turbine generator is leakage of magnetic flux between circumferentially adjacent magnets. The leakage flux does not cross the magnetic airgap and hence is not effective for generating power. The magnet utilization of the generator can be increased by eliminating magnet material that does not generate power. Accordingly circumferential spaces, typically greater than 0.1 inch and usually several times larger, can be left between circumferentially adjacent magnets. Circumferential sections of generator rotors utilizing abutted magnets and circumferentially spaced magnets are shown in FIGS. 28A and 28B, respectively. The abutted magnet generator 340 shown in FIG. 28A includes two generator rotor portions 341, 342 that have alternating permanent magnets 343, 344 attached. The magnets 343, 344 drive magnetic flux 346 across the magnetic airgap 345. Because the magnets 343, 344 are circumferentially abutted on the rotor portions 341, 342, magnetic leakage flux 347 is produced. The distribution of flux 346 and leakage flux 347 results in a live zone 349 and a dead zone 348.

The spaced magnet rotor generator 360 shown in FIG. 28B includes two rotor portions 361, 362 with alternating polarity magnets 363, 364 attached. The magnets 363, 364 drive flux 366 across the magnetic airgap 365. Between the magnets 363, 364 are spaces 367 such that leakage flux is minimized. The distribution of flux 366 and spaces 367 again results in a live zone 369 and a dead zone 368. The design, however, reduces the amount of magnet material used in the generator without significantly affecting the flux distribution in the airgap 365.

Figure 29:
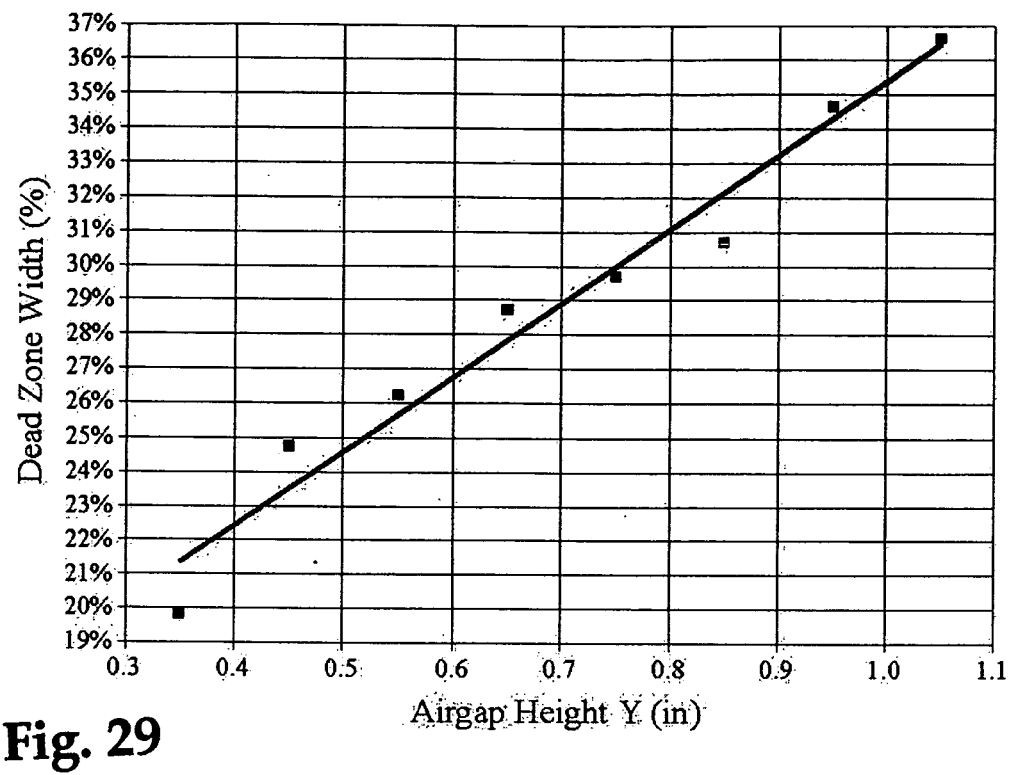
FIG. 29 is a graph showing magnetic dead zone width for a particular generator versus the airgap thickness.

The magnetic dead zone is influenced by several parameters including the airgap thickness, magnet height and also the airgap flux density. The magnetic dead zone for a particular generator versus the airgap thickness is shown in FIG. 29. The greater the airgap thickness, the more leakage flux that occurs and hence the greater the magnetic dead zone.

Figure 30:
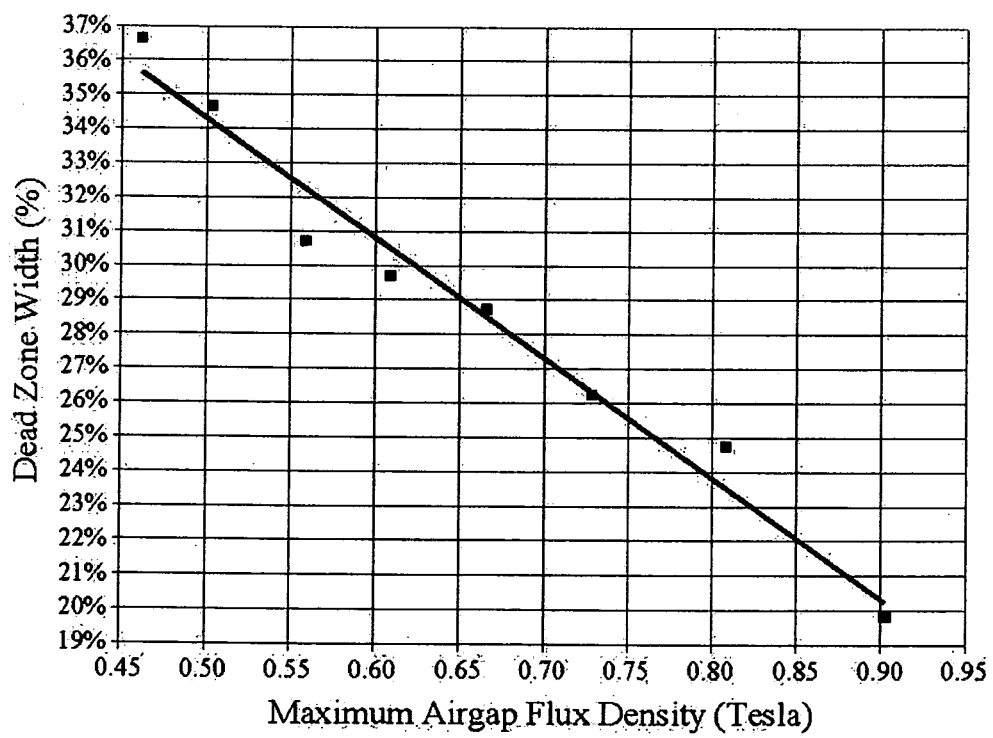
FIG. 30 is a graph showing magnetic dead zone width for a particular generator versus the airgap flux density.
Figure 32:
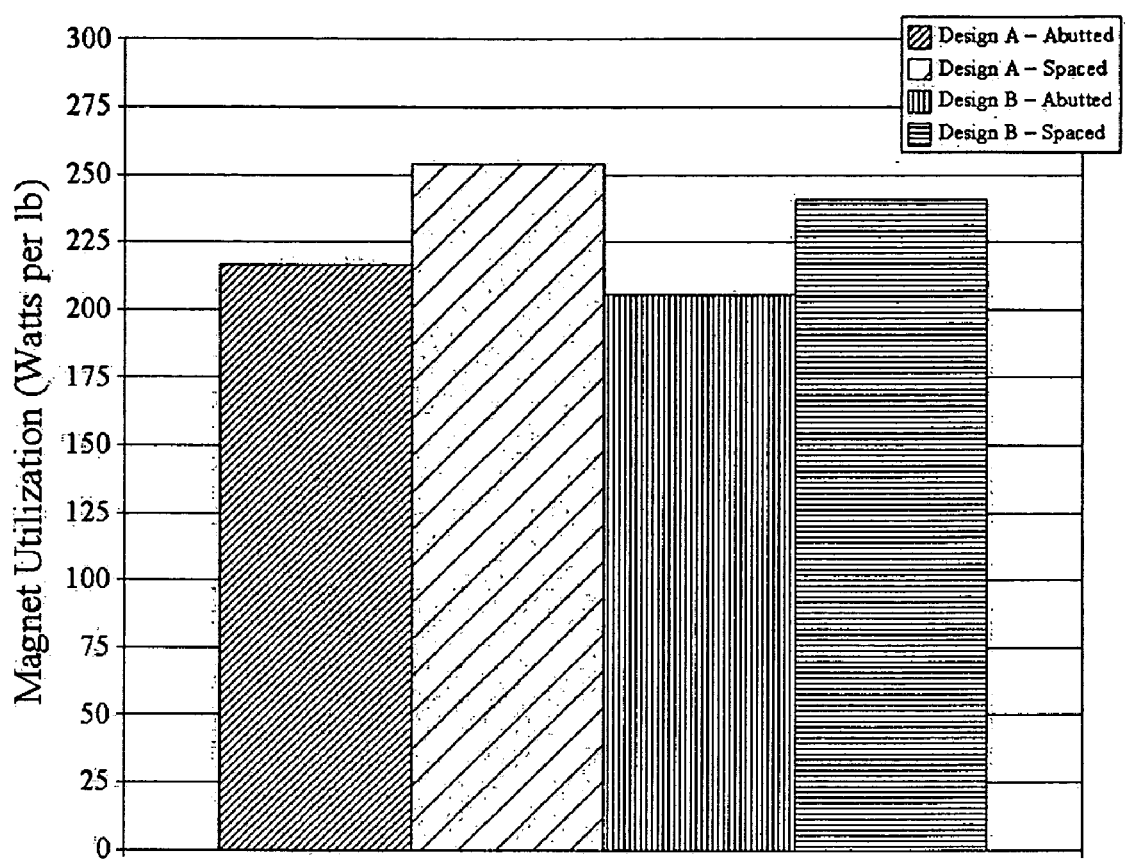
FIG. 32 is a bar chart comparing magnet utilization between generator rotors utilizing abutted magnets and circumferentially spaced magnets.

The magnetic dead zone for a particular generator versus the airgap flux density is shown in FIG. 30. The higher the magnetic flux density in the airgap, the more flux that jumps the airgap and the smaller the amount of leakage flux and dead zone. A comparison of magnet utilization between generator rotors utilizing abutted magnets and circumferentially spaced magnets for two generator designs is shown in FIG. 32. The spaced magnet construction eliminates a substantial amount of magnet material. Magnet utilization for the designs shown was increased by more than 15% by including the circumferential spaces.

Figure 31:
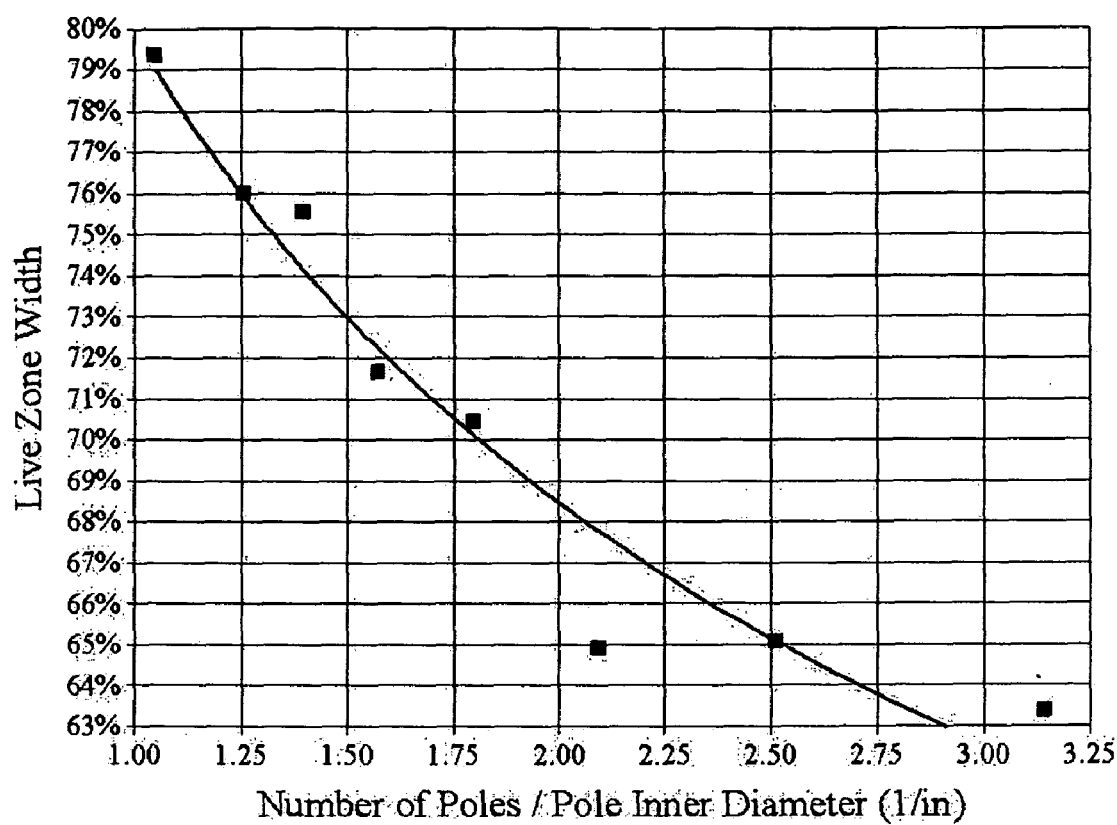
FIG. 31 is a graph showing percent live zone width versus ratio of number of generator poles per diameter.

Yet another way to influence the percentage of live zone and dead zone of the generator is through the circumferential length of the magnet poles. Leakage only occurs at the circumferential ends of the magnets so increasing the magnets arc length will increase the percentage of live zone. The circumferential width of the poles is directly related to the number of poles of the generator and the generator diameter. The percent live zone versus ratio of number of generator poles per diameter of a generator is shown in FIG. 31. The generator has n magnetic poles around the circumference of one of the generator rotor portions and the magnetic poles have an inner diameter in inches, ID. To limit the amount of dead zone, in many cases, the ratio of n/ID is preferably between 0.5 and 2.0.

Figure 33A:
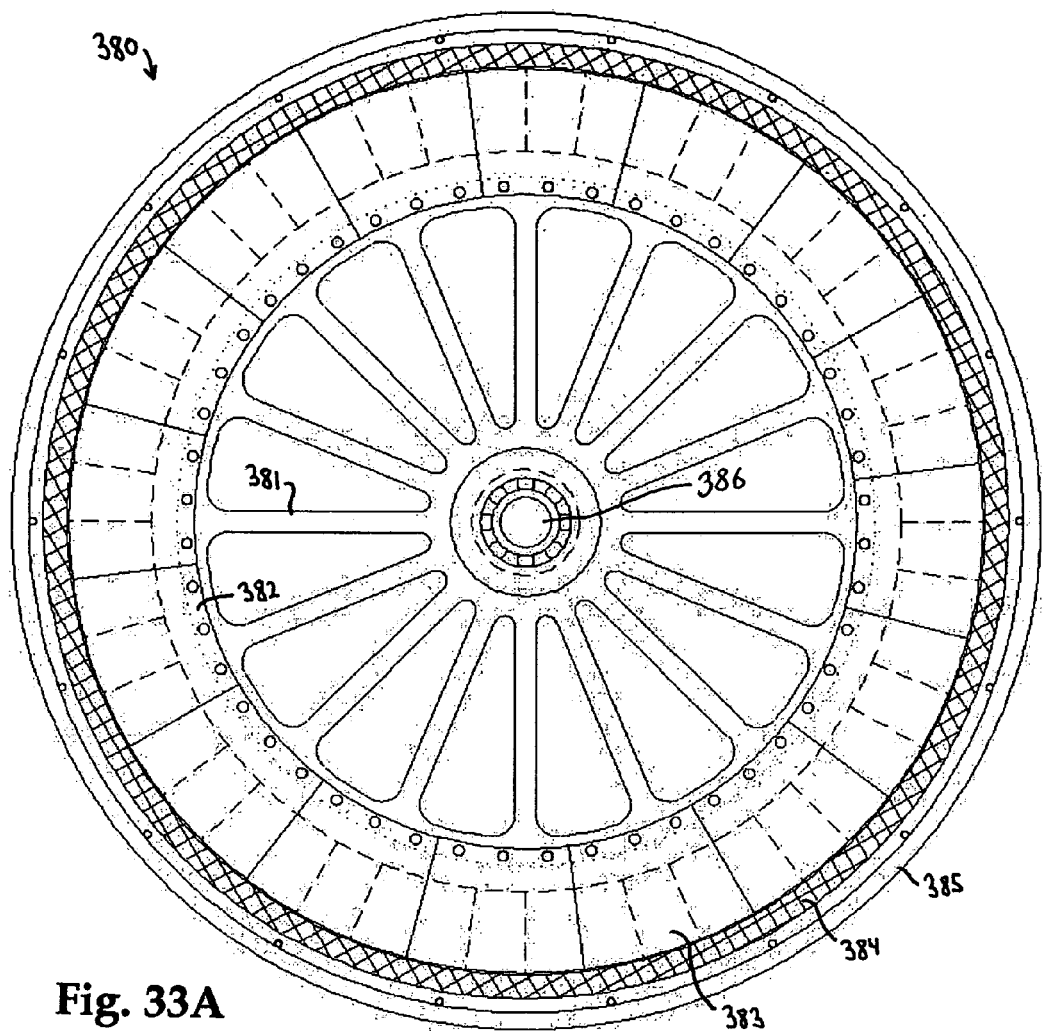
FIG. 33A is a schematic plan view of a modular generator in accordance with the invention.
Figure 33B:
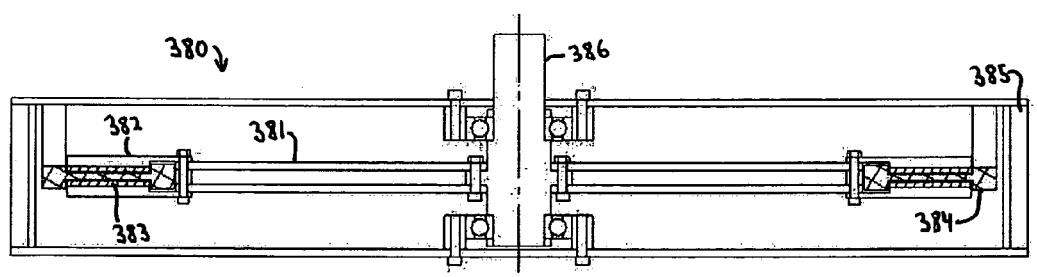
FIG. 33B is a schematic elevation of a modular generator in accordance with the invention.

The wind turbine generator of this invention is uniquely suited for modular construction due to the larger magnetic airgap, easier tolerance requirements and lack of rotor to stator magnetic attraction. Modular construction can provide for easier transportation and installation of the wind turbine because smaller pieces can be moved and later assembled onsite. A modular generator 380, shown in FIGS. 33A and 33B, includes a rotor hub 381 that couples to a central shaft 386. Generator rotor portions or back irons 382 are attached to the hub 381 by bolting on in pieces. Each piece 382 can have one or more magnetic poles 383. Besides allowing for on site assembly the assembly process is also easier because only one or a few magnets are handled at a time for reduced assembly forces. The air core armature 384 can also be made with modular arc segment construction if desired. The armature arc section 384 are then bolted together and electrically wired together. The housing 385 encloses the generator rotor 381 and armature 384. It too can easily utilize modular construction from easier transportability and handling. Modular construction can provide a substantial advantage, especially for large generators 3–5 meters in diameter, where transportation and installation become difficult. The generator 380 is shown with a vertical axis, but it will be understood that the generator 380 can be, and in the most common modern wind generator designs would be, oriented with the axis of the central shaft horizontal.

Figure 34A:
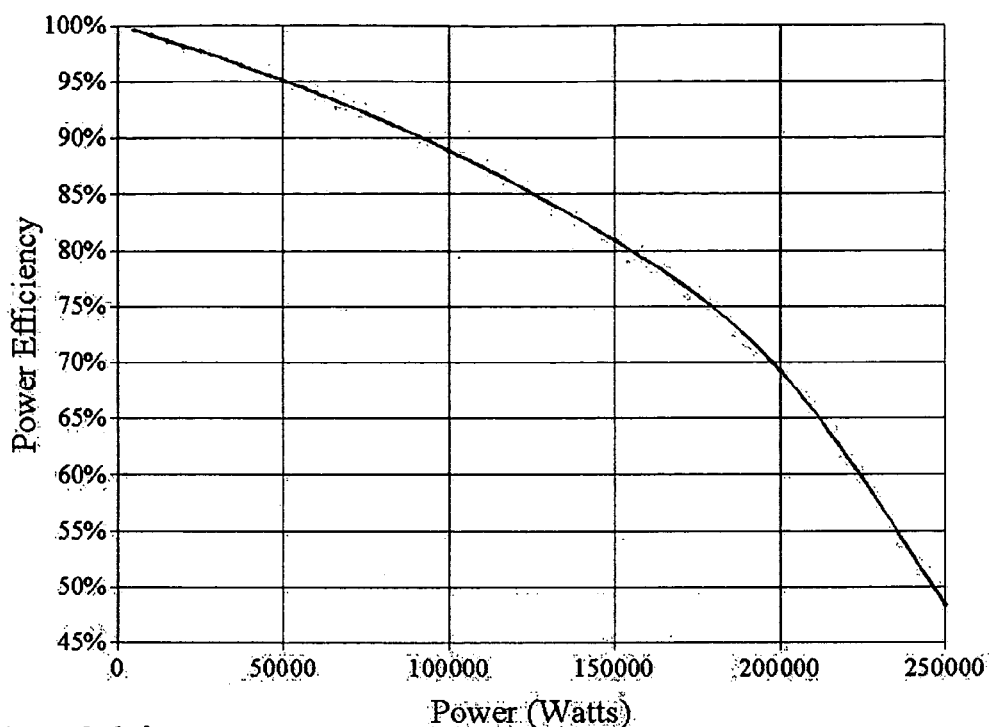
FIG. 34A is a graph showing generator efficiency versus power generation for a wind turbine generator in accordance with the invention.
Figure 34B:
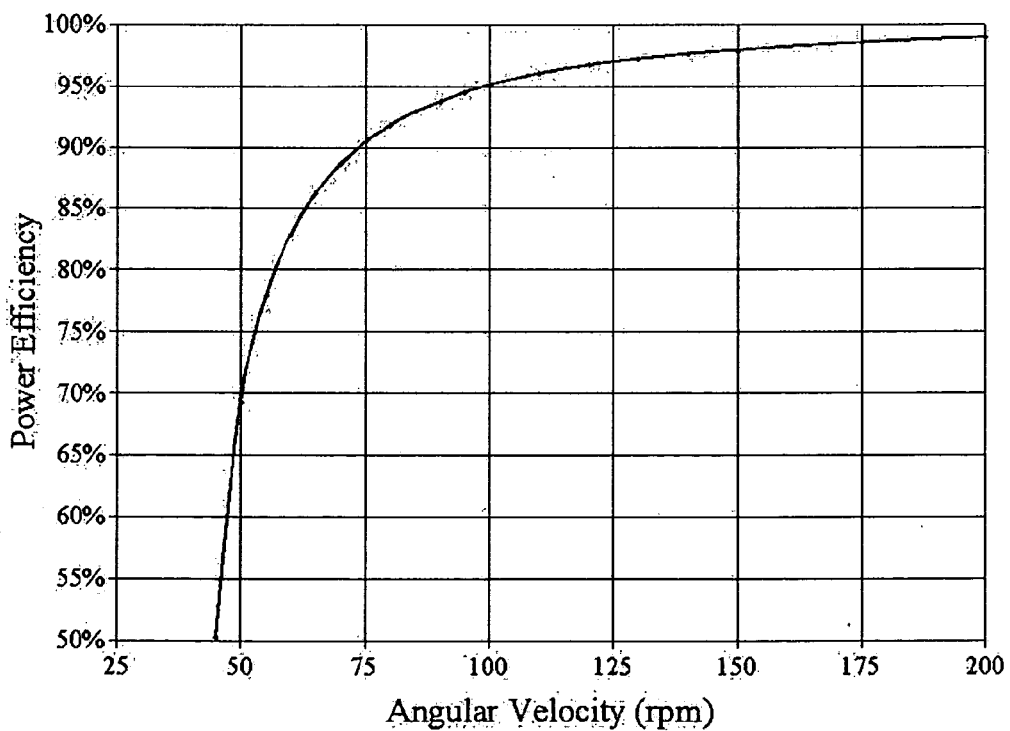
FIG. 34B is a graph showing generator efficiency versus angular velocity for a wind turbine generator in accordance with the invention

The performance of the wind turbine generator can be made exceedingly high and greater than 95% due to the eliminating of stator steel losses and the high winding density of the armature, and some of the other design innovations noted above. The generator efficiency versus power generation for an alternating polarity permanent magnet wind turbine generator in accordance with the invention is shown in FIG. 34A. The generator efficiency approaches 100% as the load is reduced, however aerodynamic drag, bearing and other losses would reduce this efficiency somewhat. The 50 kW generator produces 50 kW of power at 95% efficiency. The generator efficiency versus angular velocity for a wind turbine generator in accordance with the invention is shown in FIG. 34B. The efficiency increases with increasing rotational speed for the 50 kW power generation. At 100 rpm, the given generator produces the 50 kW of power with 95% efficiency. Other power levels, such as 10 kW to 5 MW and greater, can also be produced by wind turbine generators in accordance with the invention and can operate at other rotational speeds as required.

Figure 35A:
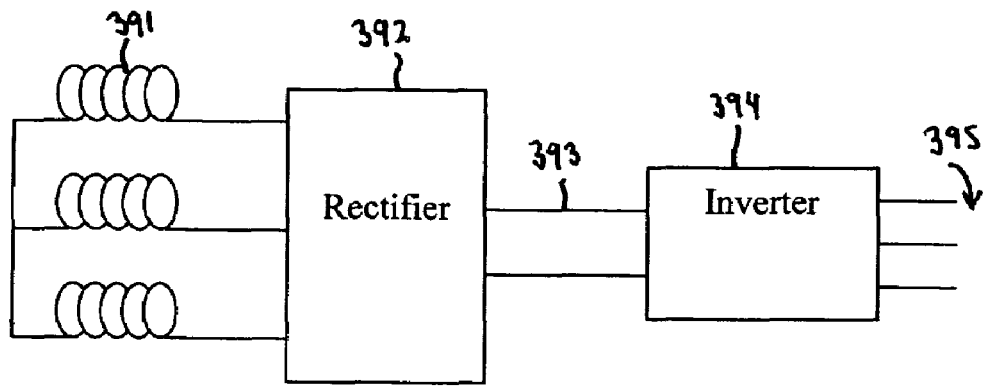
FIG. 35A is a schematic drawing of a wind turbine power system in accordance with the invention.

The wind turbine can be electrically connected to supply power in the same manner as other variable speed wind turbines. A wind turbine power system in accordance with the invention is shown in FIG. 35A. The power system 390 comprises the generator armature windings 391, which are coupled to a rectifier 392. The rectifier 392 provides DC power 393 to an inverter 394. The inverter produces utility grade AC power 395 for connection to loads or to the utility grid. The rectifier 392 can be a diode rectifier or alternatively a pulse width modulation rectifier. Diode rectifiers create harmonics back in the generator, which can add to generator losses. Such losses are less in the invention because of the lack of a steel stator and the low armature inductance and higher power factor. A pulse width modulated rectifier can alternatively reduce harmonic losses and can also serve to drive the generator as a motor to allow starting in reduced wind speeds.

Figure 35B:
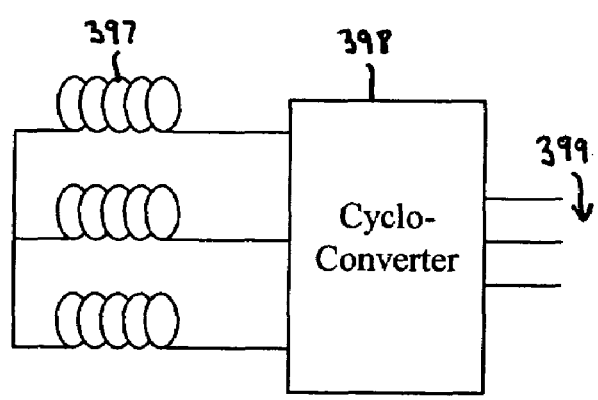
FIG. 35B is a schematic drawing for an alternate configuration wind turbine power system in accordance with the invention.

An alternative wind turbine power system in accordance with the invention is shown in FIG. 35B. In this case, the power system 396 comprises the armature windings 397 that are connected to a cycloconverter 398. The cycloconverter, or matrix converter, converts the variable frequency and voltage power from the armature windings 397 directly to utility grade AC power 399. For proper functioning, the frequency of the generator AC power from the armature windings 397 is preferably at least three times higher than the frequency of the utility grade AC output power 399.

Obviously, numerous other modifications, combinations and variations of the preferred embodiments described above are possible and will become apparent to those skilled in the art in light of this specification. For example, the invention is disclosed for use in wind turbine energy conversion systems, but it would also be useful in other direct-drive energy conversion applications. Moreover, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims,

What is claimed is:

1. A wind turbine for generating electrical power from wind energy comprising:
   a turbine rotor mounted for rotation to be driven by wind, and for converting energy in said wind into rotational energy;
   a generator coupled with said turbine rotor such that said turbine rotor drives said generator;

said generator comprising a stationary air core armature that is located in a magnetic airgap between two generator rotor portions mounted to rotate together on opposite sides of said stationary air core armature, said generator rotor portions comprising circumferential arrays of multiple alternating polarity permanent magnets attached to ferromagnetic back irons such that said permanent magnets drive magnetic flux back and forth between each rotor portion and through said stationary air core armature;

said stationary air core armature comprising a substantially nonmagnetic form having a support portion and an enclosed portion, wherein said support portion is connected to stationary support structure of said wind turbine and said enclosed portion extends inside said magnetic airgap;

said stationary air core armature further comprising windings of multiple individually insulated conductors that are wound onto said form with two separate portions including an active length portion and an end turn portion;

said end turn portion is located outside said magnetic airgap and traverses predominately circumferentially and said active length portion is located in said magnetic airgap and traverses predominately non-circumferentially and perpendicular to the direction of the magnetic airgap, said form reacts electromagnetically induced torque from said active length portions to said stationary support structure at said support portion; whereby, AC voltage is induced in said windings as said wind drives said turbine rotor.

2. A wind turbine as described in claim 1 wherein:
said windings are wound on and bonded to said substantially nonmagnetic form to facilitate transfer of torque from said windings to said stationary structure of said generator.

3. A wind turbine as described in claim 1 wherein:
said magnetic airgap has a maximum magnetic flux density in said magnetic airgap in Tesla, Bg, such that $0.3 \leq Bg \leq 0.7$.

4. A wind turbine as described in claim 1 wherein:
said magnetic airgap has a thickness in the direction of flux in inches, y, and said permanent magnets of both rotors combined have a total thickness in the direction of flux in inches, 2x, such that $0.2 \leq x/y \leq 1.0$.

5. A wind turbine as described in claim 1 wherein:
said generator utilizes a modular construction that is assembled from multiple ferromagnetic arc sections.

6. A wind turbine as described in claim 1 wherein:
said permanent magnets are assembled on each said generator rotor portion such that circumferential spaces greater than 0.10 inch are left between adjacent permanent magnets.

7. A wind turbine as described in claim 1 wherein:
said windings of said air core armature are compacted during manufacturing by utilizing an evacuated flexible film layer enclosing said windings; and
bonding resin is cured in said armature while enclosed by said evacuated flexible film layer.

8. A wind turbine as described in claim 1 wherein:
said windings comprise multiple phases, and each phase of said windings occupies a separate layer through the thickness of said air core armature.

9. A wind turbine as described in claim 1 wherein:
said magnetic airgap is axial and said permanent magnets have axial magnetization.

10. A wind turbine as described in claim 1 wherein:
said magnetic airgap is radial and said permanent magnets have radial magnetization.

11. A wind turbine as described in claim 1 wherein:
said windings are wound in a serpentine path onto said form around the circumference of said magnetic airgap, wherein said serpentine path undulates back and forth between said support portion and said enclosed portion.

12. A wind turbine for generating electrical power from wind energy comprising:
a turbine rotor mounted for rotation by capturing said wind energy and for converting said wind energy into rotational energy;
a permanent magnet generator coupled with said turbine rotor such that said turbine rotor drives said generator;
said generator comprising a stationary air core armature that is located in a magnetic airgap between two generator rotor portions mounted for co-rotation, said generator rotor portions comprising circumferential arrays of multiple alternating polarity magnetic poles attached to ferromagnetic back irons such that said permanent magnets magnetic flux back and forth between each rotor portion and through said stationary air core armature;
said stationary air core armature comprising a substantially non-magnetic form having a support end, an opposite end, and intermediate portions between said support and opposite ends, said support end being attached to and supported by stationary structure of said wind turbine, and said intermediate portions lie in said magnetic airgap;
said stationary air core armature further comprising windings having active length portions and end turn portions, wherein said end turn portions traverse predominantly in a circumferential direction, and said active length portions traverse inside said airgap in a direction transverse to said flux in said airgap and transverse to said circumferential direction to generate electromagnetically induced torque on said active length portions when said generator rotor portions rotate relative to said armature;
said windings are wound onto and secured to said form such that said form reacts said electromagnetically induced torque to said stationary support structure at said support end of said form;
said windings are wound in a serpentine path onto said form around the circumference of said magnetic airgap, wherein said serpentine undulates back and forth towards said support end and said opposite end, traversing said intermediate portions of said form;
whereby, AC voltage is induced in said multiple phase windings as wind drives said turbine rotor to rotates.

13. A wind turbine as described in claim 12 wherein:
said magnetic airgap is radial, and said permanent magnets have radial magnetization.

14. A wind turbine as described in claim 13 wherein:
said magnetic airgap has a thickness in the direction of flux in inches, y, and said permanent magnets of both rotors combined have a total thickness in the direction of flux in said airgap in inches. 2x, such that $0.2 \leq x/y \leq 1.0$.

15. A wind turbine as described in claim 13 wherein:
said ferromagnetic back irons, to which said permanent magnets are attached, a thickness in inches, z;
said magnetic airgap has a thickness in the direction of flux in inches, y;

said permanent magnets of both rotors combined have a total thickness in the direction of flux in said airgap in inches, 2x;

said circumferential array of multiple alternating magnetic poles has an inner diameter in inches, ID; and said magnetic poles around the circumference of one of said generator rotor portions has a number, n, such that $0.3 \leq ((0.029 z \times n)/(y \text{ ID})) \leq 1.5$.

16. A wind turbine as described in claim 15 wherein:
said back irons are constructed from ferromagnetic material having less than 0.3% carbon.

17. A wind turbine as described in claim 12 wherein:
said permanent magnets are assembled on each said generator rotor portion such that circumferential spaces greater than 0.10 inch are left between adjacent permanent magnets.

18. A wind turbine as described in claim 17 wherein:
said magnetic airgap has a maximum magnetic flux density in Tesla, Bg, such that $0.3 \leq Bg \leq 0.7$.

19. A wind turbine as described in claim 12 wherein:
said magnetic airgap has a thickness in the direction of flux in said airgap, in inches, y, and said permanent magnets of both rotors combined have a total thickness in the direction of flux in inches, 2xsuch that $0.2 \leq x/y \leq 1.0$.

20. A wind turbine as described in claim 12 wherein:
said generator rotor portions utilizes modular arc section construction such that permanent magnets are attached to circumferential arc portions and then subsequently fastened to the generator rotor.

21. A wind turbine as described in claim 12 wherein:
said generator has n magnetic poles around the circumference of one of said generator rotor portions and said magnetic poles have an inner diameter in inches, ID, such that $0.5 \leq n/ID \leq 2$.

22. A wind turbine as described in claim 12 wherein:
said turbine rotor directly drives said generator rotor so that said generator rotor and said turbine rotor rotate with the same angular velocity.

23. A wind turbine as described in claim 22 wherein:
said windings comprise multiple phases, and each phase of said multiple phase windings occupies a separate layer through the thickness of said air core armature.

24. A wind turbine as described in claim 12 wherein:
said end turn portion having a thickness that is greater than the thickness of said active length portion in the direction of said magnetic airgap.

25. A wind turbine as described in claim 24 wherein:
said windings are wound with wire formed of a grouped bunch of electrically parallel connected individually insulated conductors such that the reduced individual conductor area increases the windings flexibility for winding on to said substantially nonmagnetic form and reduces losses in said active length portions.

26. A wind turbine as described in claim 25 wherein:
said windings are compacted such that they substantially fill the spaces between conductors in the center of said active length portion.

27. A wind turbine as described in claim 24 wherein:
said turbine rotor directly drives said generator rotor so that said generator rotor and said turbine rotor rotate with the same angular velocity.

28. A wind turbine as described in claim 24 wherein:
said windings are wound onto and bonded to said substantially nonmagnetic form that transfers torque from said windings to said stationary structure of said generator.

29. A wind turbine as described in claim 28 wherein:
said active length portions are located on one side of said form, and said end turns are located on an opposite side of said form.

30. A wind turbine as described in claim 24 wherein:
said windings of said air core armature are compacted during manufacturing by utilizing an evacuated flexible film layer enclosing said windings.

31. A wind turbine as described in claim 24 wherein:
said air core armature utilizes a modular construction that is assembled from multiple arc sections.

32. A wind turbine as described in claim 12 wherein:
said windings comprise more than three phases.

33. A method for generating electrical power from wind energy with a wind turbine comprising:
locating a wind turbine in an area with wind such that wind rotates the turbine rotor of said wind turbine;
said turbine rotor converting wind energy into rotational energy and being coupled to a permanent magnet generator such that said turbine rotor drives said generator;
said generator comprising a stationary air core armature having windings located in a magnetic airgap between two co-rotating generator rotor portions, said generator rotor portions comprising circumferential arrays of multiple alternating polarity magnetic poles that drive flux back and forth between each rotor portion and through said stationary air core armature;
supporting said windings of said stationary air core armature on a substantially non-magnetic form, said windings having active length portions and end turn portions wherein said end turn portions traverse predominately circumferentially and said active length portions traverse inside said magnetic airgap to generate electromagnetically induced torque on said active length portions when said generator rotor portions rotate;
supporting said substantiality non-magnetic form at one end on a supporting structure of said wind turbine, and reacting said magnetically inducted torque on said active length portions through said form to said supporting structure;
whereby, rotation of said generator portions by said turbine rotor induces AC voltage in said windings as said turbine rotor rotates.

34. A method for generating electrical power as described in claim 33 wherein:
generating a maximum magnetic flux density in Tesla, Bg, such that $0.3 \leq Bg \leq 0.7$ in said magnetic airgap having a thickness in the direction of flux in said airgap in inches, y, with said permanent magnets attached to ferromagnetic back irons that have a thickness in inches, z, and said permanent magnets of both rotors combined have a total thickness in the direction of flux in inches, 2x, said circumferential array of multiple alternating magnetic poles has an inner diameter in inches. ID, and said magnetic poles around the circumference of one of said generator rotor portions has a number, n, such that $0.3 \leq ((0.029\ z \times n)/(y\ \text{ID})) \leq 1.5$.

35. A method for generating electrical power as described in claim 34 wherein:
driving said two generator rotor portions directly with said turbine rotor so that said generator portions and said turbine rotor rotate with the same angular velocity.

36. A method for generating electrical power as described in claim 33 wherein:
said end turn portions are located outside said magnetic airgap and traverses predominately circumferentially and said active length portions are located in said magnetic airgap and traverses predominately non-circumferentially and perpendicular to the direction of the flux in said magnetic airgap, said end turn portion having a thickness that is greater than the thickness of said active length portion in the direction of said magnetic airgap.

37. A method for generating electrical power as described in claim 36 wherein:

reducing losses in said active length portions of said with wire formed of a grouped bunch of electrically parallel connected individually insulated conductors with reduced individual conductor area, and increasing flexibility of said windings for winding onto said substantially nonmagnetic form.

38. A method for generating electrical power as described in claim 33 wherein:

said windings are wound in a serpentine path onto said substantially non-magnetic form around the circumference of said magnetic airgap, wherein said serpentine path undulates back and forth between said one end and an opposite cantilevered end of said substantially non-magnetic form, traversing an intermediate portion of said substantially non-magnetic form in said magnetic airgap.

39. A method for generating electrical power as described in claim 33 wherein:

compacting said windings of said air core armature during manufacturing by utilizing an evacuated flexible film layer enclosing said windings.

40. A method for generating electrical power as described in claim 33 wherein:

assembling said generator as a modular construction from multiple ferromagnetic arc sections.

* * * * *